(12) United States Patent
Zorabedian

(10) Patent No.: US 9,563,060 B1
(45) Date of Patent: Feb. 7, 2017

(54) BROAD-BAND MODE MATCHING

(71) Applicant: Lockheed Martin Corporation, Bethesda, MD (US)

(72) Inventor: Paul Zorabedian, Mountain View, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 326 days.

(21) Appl. No.: 14/253,749

(22) Filed: Apr. 15, 2014

Related U.S. Application Data

(60) Provisional application No. 61/813,109, filed on Apr. 17, 2013.

(51) Int. Cl.
| | | |
|---|---|---|
| *G02B 27/09* | (2006.01) | |
| *H01S 3/00* | (2006.01) | |
| *G02B 17/00* | (2006.01) | |

(52) U.S. Cl.
CPC ........... *G02B 27/0927* (2013.01); *H01S 3/005* (2013.01); *H01S 3/0071* (2013.01); *G02B 17/008* (2013.01)

(58) Field of Classification Search
CPC ............ G02B 27/0927; G02B 27/0944; G02B 27/0994; G02B 17/008; H01S 3/005; H01S 3/0071
See application file for complete search history.

(56) References Cited

U.S. PATENT DOCUMENTS

| | | | | | |
|---|---|---|---|---|---|
| 4,907,235 | A | * | 3/1990 | Kuizenga | H01S 3/109 359/328 |
| 5,088,079 | A | * | 2/1992 | Baer | G11B 7/08588 369/112.24 |
| 5,530,711 | A | * | 6/1996 | Scheps | H01S 3/094034 372/20 |
| 5,896,237 | A | * | 4/1999 | Blackmon, Jr. | G01J 1/04 250/216 |
| 5,910,963 | A | * | 6/1999 | Simon | G02B 21/0004 359/368 |
| 6,445,939 | B1 | * | 9/2002 | Swanson | A61B 5/0066 385/33 |
| 6,965,483 | B2 | * | 11/2005 | Lindblom | G02B 17/008 356/305 |
| 2002/0186742 | A1 | * | 12/2002 | Flint | G02B 6/262 372/70 |
| 2003/0107745 | A1 | * | 6/2003 | Atia | G02B 6/29358 356/519 |

(Continued)

OTHER PUBLICATIONS

Marcuse, "Loss Analysis of Single-Mode Fiber Splices," The Bell System Technical Journal, May-Jun. 1977, pp. 703-718, vol. 56, No. 5.

(Continued)

*Primary Examiner* — Eric Bolda
(74) *Attorney, Agent, or Firm* — McDermott Will & Emery LLP

(57) ABSTRACT

A beam-relay optical system is provided. The beam-relay optical system may include a single-mode optical fiber. The beam-relay optical system may also include a mode matching component. The beam-relay optical system may also include an optical resonator, where the optical resonator may include a cavity. The beam-relay optical system may also include a relay optical component. The relay optical component may relay an output of the mode matching component to the optical resonator.

18 Claims, 17 Drawing Sheets

(56) References Cited

U.S. PATENT DOCUMENTS

| | | | | |
|---|---|---|---|---|
| 2004/0126059 A1* | 7/2004 | Bhagavatula | ........ | G02B 6/2552 385/33 |
| 2005/0008045 A1* | 1/2005 | Xie | ...................... | G02F 1/3501 372/20 |
| 2007/0195434 A1* | 8/2007 | Koulikov | ............... | G01N 21/39 359/809 |
| 2010/0239207 A1* | 9/2010 | Bourget | ............... | G02B 6/0006 385/31 |

OTHER PUBLICATIONS

Herriott, et al., "Off-Axis Paths in Spherical Mirror Interferometers," Applied Optics, Apr. 1964, pp. 523-526, vol. 3, No. 4.

Herriott, et al., "Folded Optical Delay Lines," Applied Optics, Aug. 1965, pp. 883-889, vol. 4, No. 8.

Kogelnik, "Imaging of Optical Modes—Resonators with Internal Lenses," The Bell System Technical Journal, Mar. 1965, pp. 455-494.

Trutna, et al., "Multi-pass Raman Gain Cell," Applied Optics, Jan. 1980, pp. 301-312, vol. 19, No. 2.

Chapter 11: Surface Types, Zemax Optical Design Program User's Manual, Zemax Development Corp., Jul. 2011, pp. 277-344.

\* cited by examiner

 
f > 0           f < 0
FIG. 6A          FIG. 6B
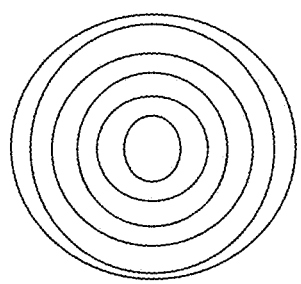
FIG. 7A

1300

1350

1400

1450

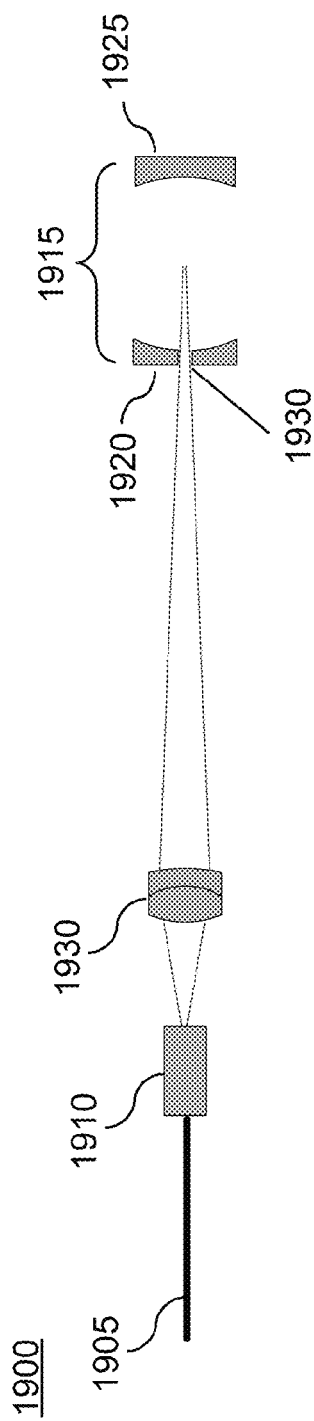
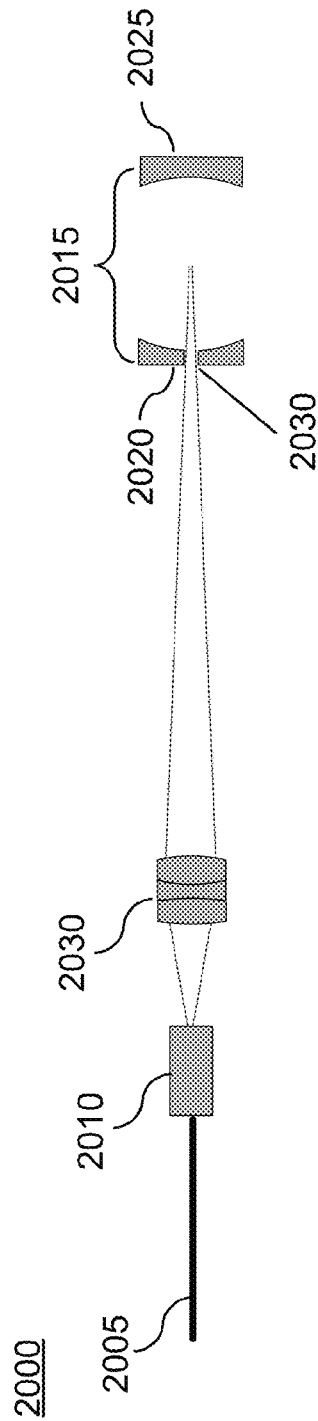
FIG. 19
FIG. 20

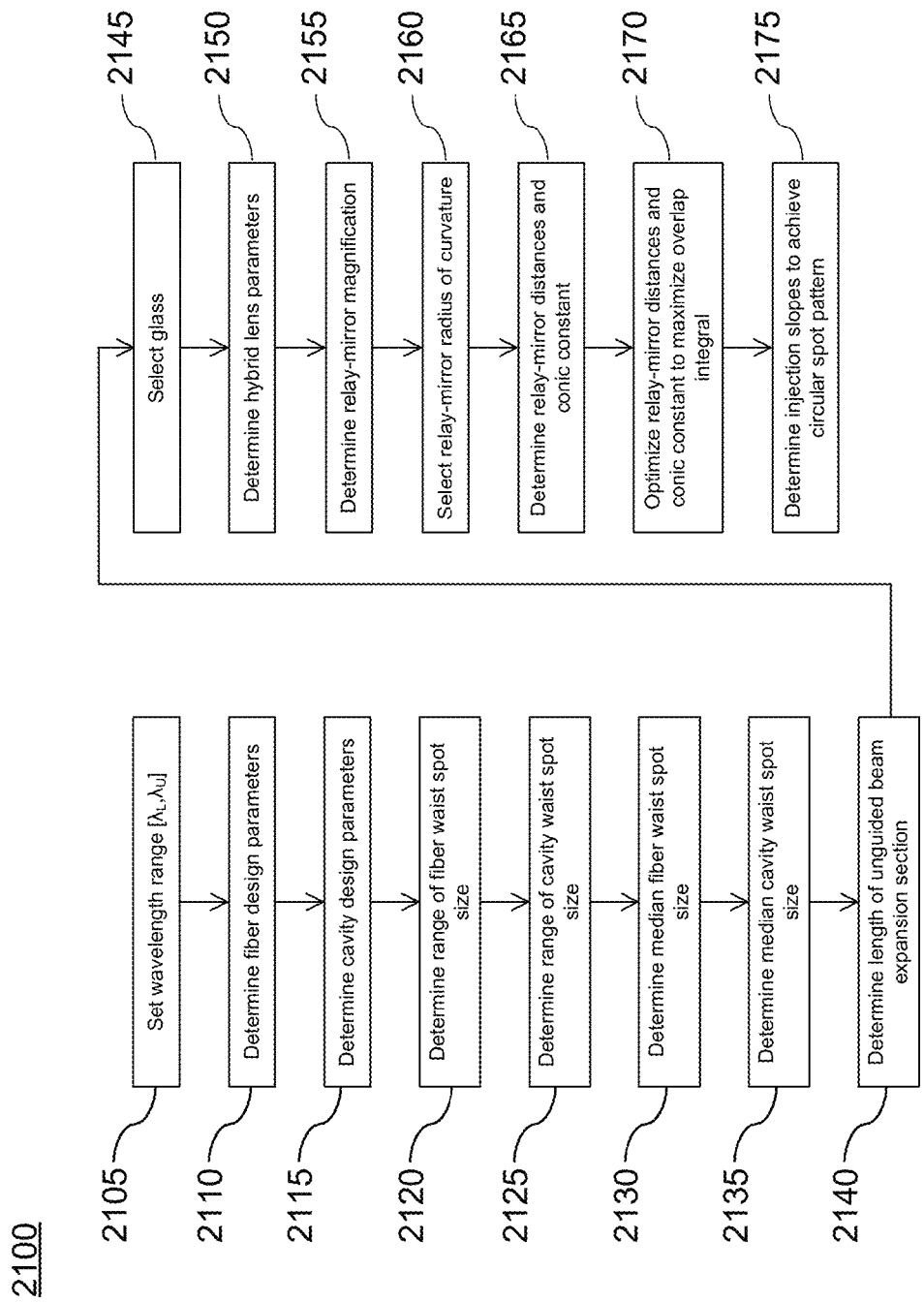

BROAD-BAND MODE MATCHING

CROSS-REFERENCE TO RELATED APPLICATIONS

The patent application claims the benefit of priority under 35 U.S.C. §119 from U.S. Provisional Patent Application No. 61/813,109, filed Apr. 17, 2013, which is incorporated herein by reference in its entirety.

STATEMENT REGARDING FEDERALLY SPONSORED RESEARCH OR DEVELOPMENT

Not applicable.

FIELD

The present disclosure generally relates to broad-band mode matching and in particular to, for example, methods and apparatuses for broad-band mode matching between an optical fiber and an optical resonator.

BACKGROUND

Optical interferometry has been developed as a technique by which to improve resolution of stellar imaging. Several observatories in the world are equipped to perform optical interferometry. These observatories have been designed primarily for stellar observations. Within the United States, observatories include the Navy Prototype Optical Interferometer (NPOI), the Center for High Angular Resolution Astronomy (CHARA), and the Magdalena Ridge Observatory Interferometer (MROI). In addition, there are two optical interferometer observatories in other parts of the world, including Very Large Telescope Interferometer (VLTI) in Chile and Sydney University Stellar Interferometer (SUSI) in Australia.

The CHARA telescope array, for instance, is laid out in a Y-pattern with two telescopes per arm, with each arm being about 200 meters in length. Pair-wise combinations of the telescopes permit fifteen different baselines ranging in length from about 30 meters to about 300 meters, with several baselines having similar lengths but lying in different orientations. From each telescope, a 6 inch diameter collimated beam is propagated through an evacuated pipe back along the arm of the Y to a 94 meter building at the vertex that encloses about 1,000 square meters of optical laboratory floor space. A majority of this space is occupied by six optical delay lines. The space also contains beam combiners, cameras, and other equipment.

Each delay line includes a series combination of a discretely-selectable segment, which has five possible settings ranging from 0 meters to approximately 146 meters, and a continuously-variable segment including a cat's-eye retroreflector mounted on a cart that moves on rails 46 meters long. A total delay ranging from 0 meters to approximately 146 meters is therefore possible. The long continuously-variable segment of the optical delay is needed to interferometrically image stars as the stars move across the sky. The beam transport pipes and the optical delay lines are major cost and facilities drivers in existing laboratories.

Many high-value commercial and military satellites orbit the Earth in geosynchronous Earth orbit (GEO) at an altitude of 34,800 kilometers. There may be economic and national security motivations for wanting to obtain resolved images of geosynchronous satellites (geosats) from the ground. A typical geosat body, called a bus, may have a maximum dimension of 2 to 10 meters. Antennas and solar panel widths may be of similar size. Solar panel lengths, for example, may be from 10 to 100 meters. However, even with the largest telescopes available, which may have apertures of 8 to 10 meters and may be equipped with adaptive optics to compensate atmospheric turbulence, only the largest features of geosats may barely be resolvable. Indeed, only a few of the largest stars may be resolvable.

SUMMARY

According to various aspects of the present disclosure, methods and apparatuses are provided for improving optical systems such that better images can be resolved. In some aspects of the present disclosure, a beam-relay optical system is provided. The beam-relay optical system may include a single-mode optical fiber. The beam-relay optical system may also include a mode matching component. The mode matching component may receive a beam from the single-mode optical fiber and may generate, at an output plane of the mode matching component, a beam waist based on the beam. The beam-relay optical system may also include an optical resonator, where the optical resonator may include a cavity. The beam-relay optical system may also include a relay optical component. The relay optical component may relay an output of the mode matching component to the optical resonator and form an image of the beam waist in the cavity.

In some aspects of the present disclosure, a method is provided. The method may include receiving, at a mode matching component, a beam. The method may also include generating a beam waist based on the beam. The method may also include relaying the beam waist to an optical resonator, where the optical resonator may include a cavity. The optical resonator may be configured to form a cavity waist at a location within the cavity. Within a range of wavelengths, wavelength dependence of the beam waist may substantially match wavelength dependence of the cavity waist.

It is to be understood that both the foregoing general description and the following detailed description are exemplary and explanatory and are intended to provide further explanation of the subject technology as claimed. It is also to be understood that other aspects may be utilized and changes may be made without departing from the scope of the subject technology.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 6A and 6B show examples of a circular diffraction gratings with a positive focal length and a negative focal length, respectively.

FIG. 7A shows a face view of an example circular grating.

FIGS. 16 through 20 show additional examples of beam-relay optical systems, according to certain aspects of the present disclosure.

FIG. 21 shows a flowchart of an example process for designing a beam-relay optical system, according to certain aspects of the present disclosure.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding. The term "example" is sometimes used as a noun and sometimes used as an adjective.

In accordance with one or more implementations of the present disclosure, an optical system for providing mode matching between an output mode of a single-mode optical fiber and the fundamental transverse electric and magnetic ($TEM_{0,0}$) mode of an optical resonator is provided. The optical system can include a single-mode optical fiber, an optical mode transformer component, an image-relay component (e.g., lens, mirror), and an optical resonator (e.g., Fabry-Perot optical resonator). The optical mode transformer can generate a new beam waist with a flat wavefront and a spot-size versus wavelength characteristic that closely matches that of the optical resonator waist (e.g., Fabry-Perot cavity waist). The optical system can be referred to more specifically as a beam-relay optical system. The optical mode transformer component can also be referred to as a mode matching component. The image-relay component can also be referred to as a relay optical component.

Figure 1:
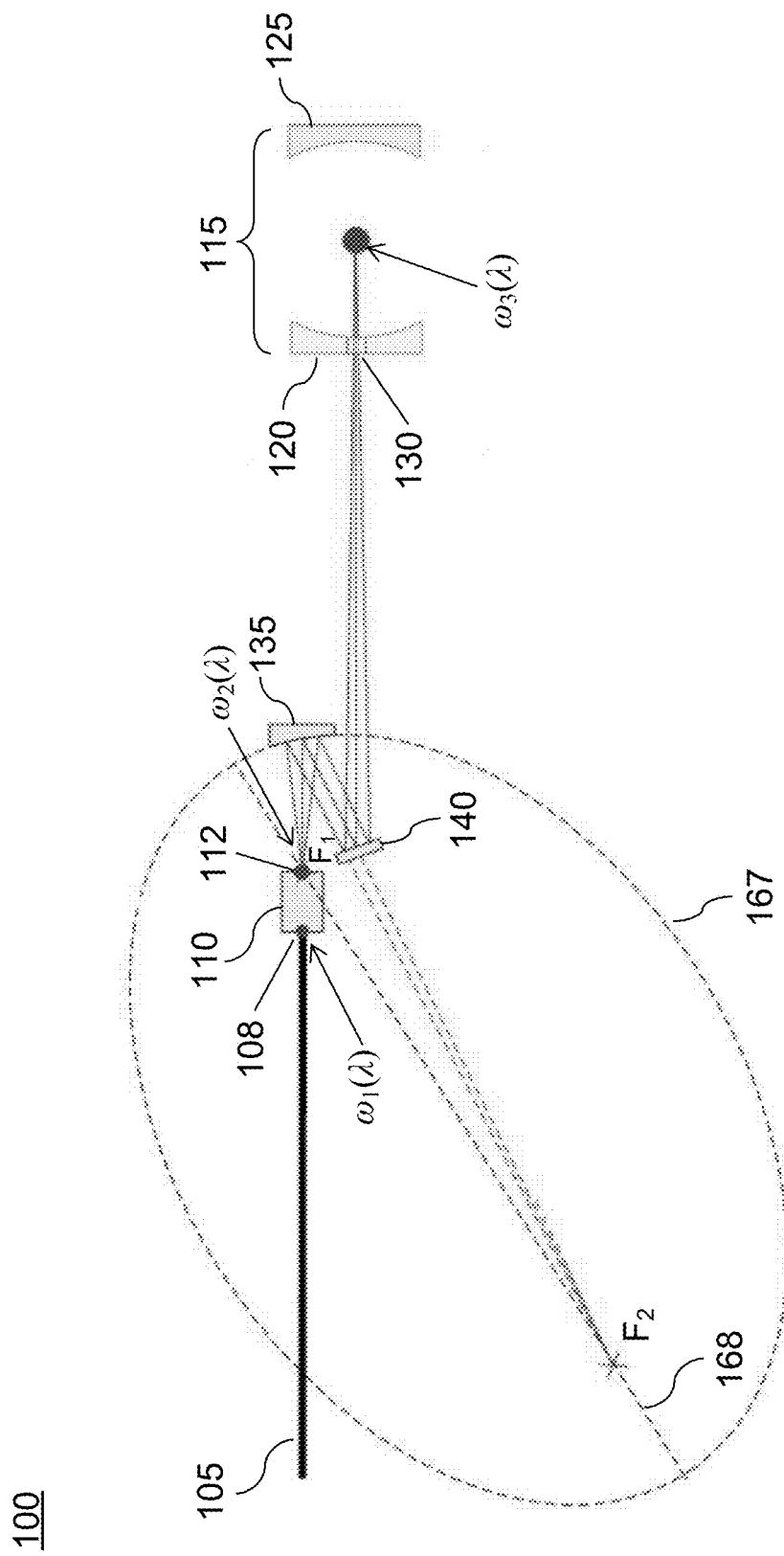
FIG. 1 shows a beam-relay optical system, according to certain aspects of the present disclosure.

FIG. 1 shows an example beam-relay optical system 100, according to certain aspects of the present disclosure. The beam-relay optical system 100 includes a single-mode optical fiber 105, a mode matching component 110, and an optical resonator 115. The single-mode optical fiber 105 permits a single mode (e.g., $TEM_{0,0}$ mode). The mode matching component 110 can include mode matching optics (not shown) that can receive, at an input plane of the mode matching component 110, a fiber beam waist $\omega_1(\lambda)$ from an output plane 108 of the single-mode optical fiber 105 and can transmit a transformed beam waist $\omega_2(\lambda)$ at an output plane 112 of the mode matching component 110. The transformed beam waist $\omega_2(\lambda)$ is generally greater than the fiber beam waist $\omega_1(\lambda)$. An image $\omega_3(\lambda)$ of the transformed beam waist $\omega_2(\lambda)$ from the mode matching component 110 can be relayed to the optical resonator 115. In some aspects, as shown in FIG. 1, the beam-relay optical system 100 includes a relay optical component that includes relay optics (e.g., 135 and 140) that can relay the output of the mode matching component 110 to the optical resonator 115. The relay optical component can relay the output of the mode matching component to a location at or close to a cavity waist. The single-mode optical fiber 105, the mode matching component 110, and the relay optical component are generally placed outside of the optical resonator 115. The beam-relay optical system 100 generally has fixed object and image distances.

In some aspects, the image is a scaled image $\omega_3(\lambda) = m\omega_2(\lambda)$ of the transformed beam waist, where m is a constant scaling factor, that can be relayed to the optical resonator 115. The image can be a magnified image, where m is a scaling factor greater than 1. In some aspects, the scaled image $\omega_3(\lambda)$ of the transformed beam waist can coincide with a location of a cavity waist. In such aspects, the image of the beam waist and the cavity waist are considered mode matched. In other aspects, the image of the beam waist and the location of the cavity waist may be in proximity of each other and are substantially mode matched. In many cases, beam waists that are substantially mode matched can be considered to be mode matched in terms of performance.

The single-mode optical fiber 105 can be a step-index optical fiber or a graded-index optical fiber that permits a single mode (e.g., $TEM_{0,0}$ mode) in the single-mode optical fiber 105 for example. However, other optical fibers that can be configured such that a single mode is permitted in the optical fiber can be utilized as the single-mode optical fiber 105.

The optical resonator 115 can be a Fabry-Perot cavity for example. The optical resonator 115 can also be referred to as an optical cavity. The Fabry-Perot cavity can include a first mirror 120 and a second mirror 125. A small hole 130 can be bored in one of the cavity mirrors (e.g, bored in cavity mirror 120 in FIG. 1). The small hole 130 facilitates entry of a beam into the optical resonator 115, such as facilitating entry of an output from the mode matching component 110.

The entry of a beam into the optical resonator 115 can also be referred to as an injection of the beam into the optical resonator 115. Within the optical resonator 115, a beam can undergo a series of transits, also referred to as bounces, between the cavity mirrors 120 and 125. In an example, for an optical cavity formed by mirrors of equal radius of curvature, the cavity waist will lie in the mid-plane between the two mirrors. For an optical cavity formed by mirrors of different radius of curvature, the cavity waist can lie at a different location between the two mirrors dependent on the radius of curvature of the two mirrors.

The relay optical component can include as relay optics an ellipsoidal mirror 135 and a plane mirror 140 whose placements allow relaying of the output of the mode matching component 110 to the optical resonator 115. In some aspects, as shown in FIG. 1, the ellipsoidal mirror 135 can be an off-axis ellipsoidal mirror. The off-axis ellipsoidal mirror is associated with a parent ellipsoid 167 and an axis of symmetry 168 that passes through foci $F_1$ and $F_2$ as well as the vertices of the parent ellipsoid 167. The off-axis ellipsoidal mirror is off-axis relative to an axis of the optical fiber along which the beam is propagating in that the beam is not impinging the off-axis ellipsoidal mirror at a vertex of the parent ellipsoid 167. Alternative to or in conjunction with the ellipsoidal mirror 135, a doublet lens and/or a triplet lens can be utilized as part of the relay optics.

In some aspects, the output plane 112 of the mode matching component 110 is placed at a first focus $F_1$ of the ellipsoidal mirror 135. The beam from the output plane 112 of the mode matching component 110 impinges on the ellipsoidal mirror 135. The reflection from the ellipsoidal mirror 135 is a converging beam that can form a new, magnified waist at a second focus $F_2$ of the ellipsoidal mirror 135. In some aspects, the plane mirror 140 can be placed to direct the converging beam away from forming a waist at the second focus $F_2$ of the ellipsoidal mirror 135 and, instead, direct the converging beam along an axis substantially parallel to the axis of the fiber and into the optical resonator 115.

In one or more implementations, transverse spatial modes of single-mode optical fibers and Fabry-Perot cavities can be described by a Gaussian electric field amplitude distribution of the form $$|E(\rho, z)| = E_o \left[\frac{\omega_o}{\omega(z)}\right] \exp\left[-\frac{\rho^2}{\omega^2(z)}\right] \quad \text{Equation 1}$$

and by a Gaussian irradiance distribution of the form $$I(\rho, z) = |E(\rho, z)|^2 = I_o \left[\frac{\omega_o}{\omega(z)}\right]^2 \exp\left[-2\frac{\rho^2}{\omega^2(z)}\right] \quad \text{Equation 2}$$

where $\rho$ is the radial coordinate about the center axis of the beam, z is the coordinate along the direction of beam propagation as measured from the location of the beam waist (e.g., z=0 at beam waist), $\omega_o$ is the spot size of the beam waist, $\omega(z)$ is the spot size at position z, $E_o$ is the peak electric field amplitude, and $I_o$ is the peak irradiance. The beam waist has a minimum spot size and infinite wavefront radius of curvature (i.e., wavefront is a plane wave at the location of the beam waist). Beams that have distributions that take the form of Equations 1 and 2 can be referred to as Gaussian beams. For purposes of discussion, the Gaussian beams are considered to propagate along a z-direction.

Figure 2:
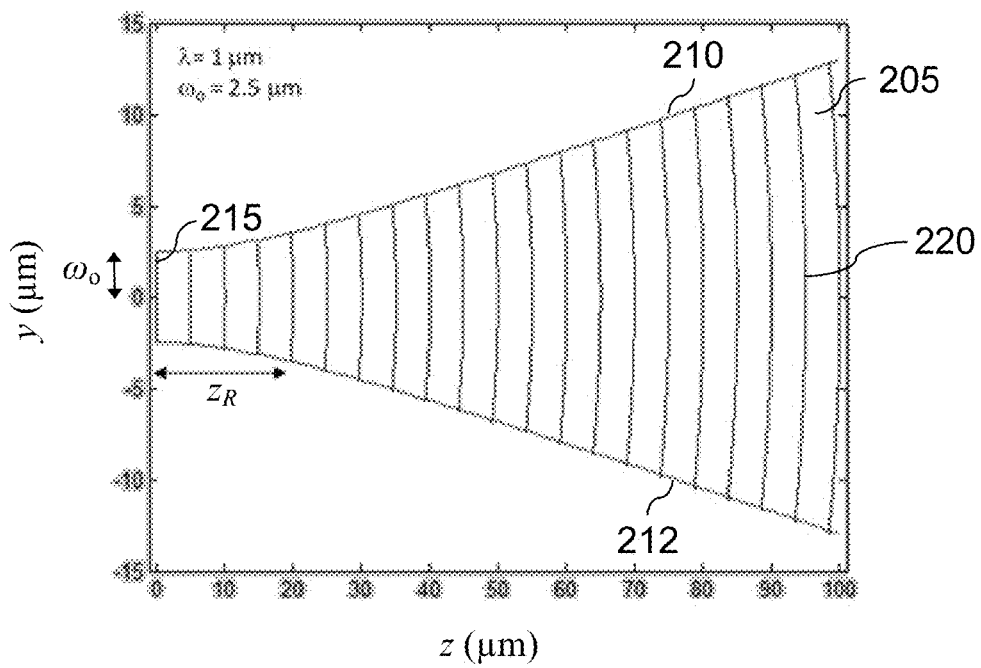
FIG. 2 shows a plot of spot size of a Gaussian beam as the beam propagates along a z direction.

FIG. 2 shows a plot 200 of spot size of a Gaussian beam 205 as the beam propagates along a z direction. The Gaussian beam 205 expands, also referred to as diverges or spreads, along transverse directions x (not shown) and y as the beam 205 propagates farther away from the beam waist $\omega_o$ in either direction (e.g., positive and negative z-directions). The $e^{-2}$ intensity limits 210 and 212 (or equivalently $e^{-1}$ electric field amplitude limits) for the Gaussian beam 205 are also shown in FIG. 2. As the beam propagates along z, the spot size $\omega(z)$ becomes larger and, accordingly, the $e^{-2}$ intensity limits 210 and 212 become farther from the z-axis.

Spot size $\omega(z)$ of a Gaussian beam can be determined by $$\omega(z) = \omega_o \sqrt{1 + \left(\frac{z}{z_R}\right)^2} \quad \text{Equation 3}$$

where $z_R$ is the Rayleigh range. The Rayleigh range $z_R$ is the distance from the beam waist at which the spot size increases by a factor of $\sqrt{2}$ from the spot size of the beam waist. Accordingly, the Rayleigh range is the distance along the direction of beam propagation beam from the beam waist at which the cross section of the Gaussian beam is doubled. The Rayleigh range $z_R$ is given by $$z_R = \frac{\pi \omega_o^2}{\lambda} \quad \text{Equation 4}$$

where $\lambda$ is the wavelength of the Gaussian beam. As example values, FIG. 2 shows a Gaussian beam of wavelength $\lambda=1$ μm and $\omega_o=2.5$ μm.

Total power in the Gaussian beam crossing the z plane is related to the peak irradiance and the waist spot size $\omega_o$ by $$P_{tot} = \frac{1}{2} I_o (\pi \omega_o^2) \quad \text{Equation 5}$$

Also shown in FIG. 2 are wavefronts (e.g., 215, 220) of the Gaussian beam 205. At the beam waist, wavefront 215 of the Gaussian beam is a plane wave and thus the radius of curvature of the wavefront 215 at the beam waist is infinite. The wavefronts (e.g., 220) of the Gaussian beam become more spherical (e.g., more curved) as the Gaussian beam 205 propagates farther from the beam waist.

With reference back to FIG. 1, in one or more implementations, the beam-relay optical system 100 includes a single-mode optical fiber 105. In some aspects, the single-mode optical fiber 105 can be a step-index optical fiber with a fiber core and a cladding of refractive index $n_1$ and $n_2$, respectively. Although the step-index optical fiber is utilized for discussion purposes, a graded-index optical fiber or otherwise an optical fiber that is configured such that only a single mode is permitted in the optical fiber can be utilized. A Gaussian beam can propagate through the step-index optical fiber and exit a planar facet polished perpendicular to the center axis of the optical fiber (e.g., perpendicular to the z direction). At an exit (e.g., output plane 108) of the step-index optical fiber, the Gaussian beam can be described as a Gaussian beam waist with a beam waist spot size that can be determined from the following empirical equation $$\omega_{o_{fiber}} = \frac{1}{2}a\left[0.65 + 1.619\left(\pi a \frac{NA}{\lambda}\right)^{-1.5} + 2.879\left(\pi a \frac{NA}{\lambda}\right)^{-6}\right] \quad \text{Equation 6}$$

where a is the physical diameter of the fiber core of the step-index optical fiber, NA is the numerical aperture of the step-index optical fiber, and is λ the wavelength of the Gaussian beam. The numerical aperture NA of the step-index optical fiber is given by $$NA = \sqrt{n_1^2 - n_2^2} \quad \text{Equation 7}$$

In one or more implementations, the beam-relay optical system 100 includes an optical resonator 115. The optical resonator 115 can be a Fabry-Perot cavity. Mode of an air-filled (n≈1) Fabry-Perot cavity can be described by Gaussian beam equations, such as those provided in Equations 1 and 2. If the optical resonator 115 includes two spherical mirrors with identical radii of curvature $R_{cavity}$, the beam waist of the mode lies in the mid-plane of the cavity. The beam waist spot size of the mode is given by $$\omega_{o_{cavity}} = \sqrt{\frac{L\lambda}{\pi}}\sqrt{\left(\frac{|g|}{2}\right)\left(\frac{1+g}{1-g}\right)^{0.5}} \quad \text{Equation 8}$$

where g can be referred to as a confocal parameter. The confocal parameter is given by $$g = 1 - \frac{L_{cavity}}{R_{cavity}} \quad \text{Equation 9}$$

where the cavity mirrors are separated by a distance $L_{cavity}$ and have identical radii of curvature $R_{cavity}$. The cavity mirrors can be glass mirrors that are coated with protected silver, ultraviolet-enhanced silver, or gold.

Figure 3:
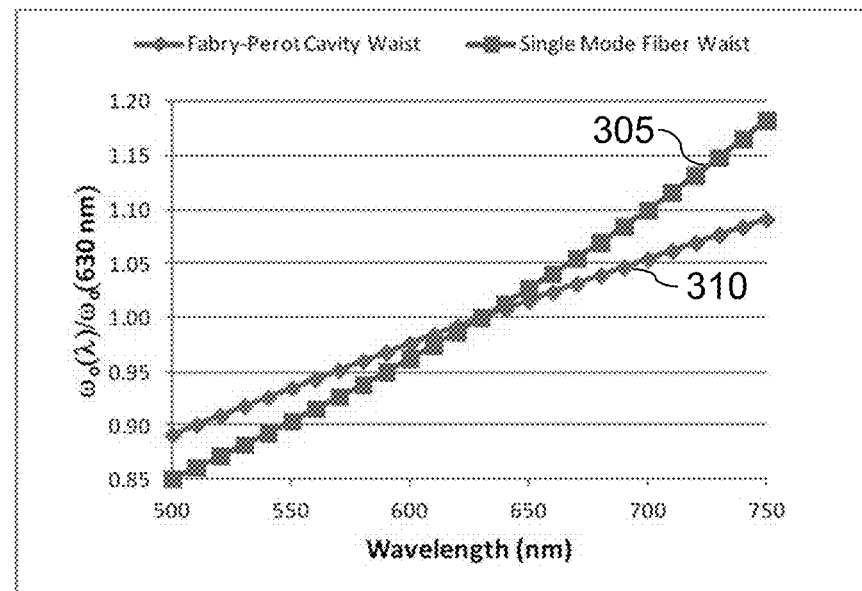
FIG. 3 shows a plot of normalized waist spot size as a function of wavelength.

FIG. 3 shows a plot 300 of normalized waist spot size as a function of wavelength. Specifically, the plot 300 shows curves 305 and 310 of the normalized waist spot size as a function of wavelength for the step-index optical fiber and the Fabry-Perot cavity, respectively. The curves 305 and 310 for $\omega_{o_{fiber}}(\lambda)/\omega_{o_{fiber}}(\lambda_o)$ and $\omega_{o_{cavity}}(\lambda_o)/\omega_{o_{cavity}}(\lambda_o)$ are provided, respectively, over a wavelength range of 500 nm to 750 nm, with wavelength $\lambda_o$ used as an arbitrary reference point. The following example parameters were used: $\lambda_o$=630 nm, a=3.5 μm, NA=0.12, $R_{cavity}$=1.75 m, and $L_{cavity}$=3.491 m.

As indicated above in Equations 6 and 8 and depicted in FIG. 3, the beam waists $\omega_{o_{fiber}}$ and $\omega_{o_{cavity}}$ have different wavelength dependencies. In one or more implementations, the beam-relay optical system (e.g., 100 in FIG. 1) includes a mode matching component (e.g., 110 in FIG. 1), which includes mode matching optics, with wavelength-dependent magnification that can be utilized to achieve mode matching between the beam waists over a spectral range. In some aspects, the mode matching can be achieved over a wide spectral range, such as wavelength range between $\lambda_L$=500 nm and $\lambda_U$=750 nm. Another example wavelength range can be $\lambda_L$=750 nm and $\lambda_U$=1,000 nm.

In one or more implementations, the mode matching component (e.g., 110 in FIG. 1) includes an unguided propagation section coupled to a hybrid lens section. The hybrid lens section can include a refractive lens element and a diffractive lens element. The unguided propagation section and hybrid lens section are generally designed such that wavelength dependencies of $\omega_{o_{fiber}}(\lambda)$ substantially matches wavelength dependencies of $\omega_{o_{cavity}}(\lambda)$ over a spectral range. The material for the unguided propagation section and the hybrid lens section can be a glass material. The material for each section can be the same or can be different. By way of non-limiting example, the glass material can be P-SF67, P-SF68, SF58, SF59, SF66, PBH71, PBH72, N-SF66, and PBH21, among others.

Figure 4:
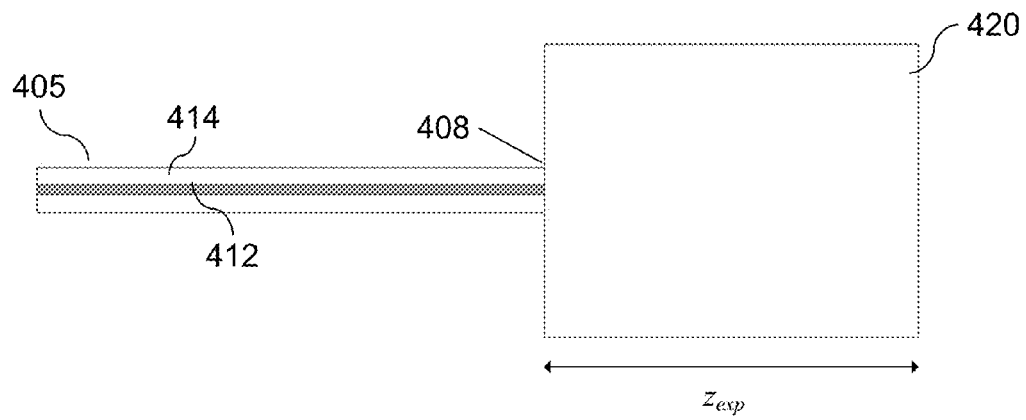
FIG. 4 shows an example of an unguided propagation section attached to a single-mode optical fiber, according to certain aspects of the present disclosure.

FIG. 4 shows an example of an unguided propagation section 420 attached to a single-mode optical fiber 405, according to certain aspects of the present disclosure. The single-mode optical fiber 405 has a core 412 and a cladding 414. In some aspects, the single-mode optical fiber 405 can be a step-index optical fiber. An output plane 408 of the single-mode optical fiber 405 is adjacent to an input plane of the unguided propagation section 420. In some aspects, the unguided propagation section 420 is not adjacent to the single-mode optical fiber 405. The unguided propagation section 420 can be part of a mode matching component (e.g., 110 in FIG. 1).

In one or more implementations, a length $z_{exp}$ of the unguided beam propagation section 420 is set such that wavelength dependence of the spot size for the mode of the optical resonator (e.g., 115 in FIG. 1), which can be a Fabry-Perot cavity, can be similar to wavelength dependence of the spot size at an output plane of the unguided beam propagation section (i.e., at $z=z_{exp}$). In such a case, the mode of the single-mode optical fiber can be matched or substantially matched, via the unguided beam propagation section 420, to the mode of the optical resonator (e.g., 115). To achieve this mode matching, given design parameters of the single-mode optical fiber (e.g., core diameter a and numerical aperture NA) and a wavelength range $\lambda_L$, $\lambda_U$, the length $z_{exp}$ of the unguided beam propagation section 420 can be determined by solving $$\frac{\omega_{fiber}(z_{exp}, \lambda_U)}{\omega_{fiber}(z_{exp}, \lambda_L)} = \frac{\omega_{o_{cavity}}(\lambda_U)}{\omega_{o_{cavity}}(\lambda_L)} = \sqrt{\frac{\lambda_U}{\lambda_L}} \quad \text{Equation 10}$$

where the design parameters and the wavelength range are generally interconnected and can be selected based on application. The values $\omega_{fiber}(z_{exp}, \lambda_U)$ and $\omega_{fiber}(z_{exp}, \lambda_L)$ denote an output of the single-mode optical fiber after the output has propagated over a distance $z_{exp}$ for wavelength $\lambda_U$ and $\lambda_L$, respectively.

Each of $\omega_{fiber}(z_{exp}, \lambda_U)$ and $\omega_{fiber}(z_{exp}, \lambda_L)$ can take the forms provided above in Equations 3 and 6, which can be substituted into Equation 10 above to obtain $$\left|\frac{0.65 + 1.619\left(\pi a \frac{NA}{\lambda_U}\right)^{-1.5} + 2.879\left(\pi a \frac{NA}{\lambda_U}\right)^{-6}}{0.65 + 1.619\left(\pi a \frac{NA}{\lambda_L}\right)^{-1.5} + 2.879\left(\pi a \frac{NA}{\lambda_U}\right)^{-6}}\right| \times \quad \text{Equation 11}$$

-continued $$\left(\sqrt{\frac{1+\dfrac{\lambda_U^2 z_{exp}^2}{\left(\pi\left[\frac{1}{2}a\left[0.65+1.619\left(\pi a\frac{NA}{\lambda_U}\right)^{-1.5}+2.879\left(\pi a\frac{NA}{\lambda_U}\right)^{-6}\right]\right]^2\right)^2}}{1+\dfrac{\lambda_L^2 z_{exp}^2}{\left(\pi\left[\frac{1}{2}a\left[0.65+1.619\left(\pi a\frac{NA}{\lambda_L}\right)^{-1.5}+2.879\left(\pi a\frac{NA}{\lambda_L}\right)^{-6}\right]\right]^2\right)^2}}}\right)=\sqrt{\frac{\lambda_U}{\lambda_L}}$$

Using Equation 11, $z_{exp}$, the only unknown in Equation 11, can be solved either graphically or with standard numerical methods using an analysis package software such as Matlab®, Mathcad®, or Mathematica®.

Equation 10 provides one example of an equation for matching wavelength dependencies. Equation 10 utilizes extremes of a desired wavelength range (e.g., $\lambda_L$=500 nm and $\lambda_U$=750 nm) for matching. In other examples, a least square matching can be based on more than two values, such as based on an upper wavelength value, a middle wavelength value, and a lower wavelength value in a desired wavelength range. For example, the desired wavelength range for which mode matching is to be achieved can be $\lambda_L$=500 nm and $\lambda_U$=750 nm, where the least square matching can be based on upper, middle, and lower wavelength values of 700 nm, 625 nm, and 507 nm, respectively. In some aspects, more than three wavelength values are utilized.

Figure 5:
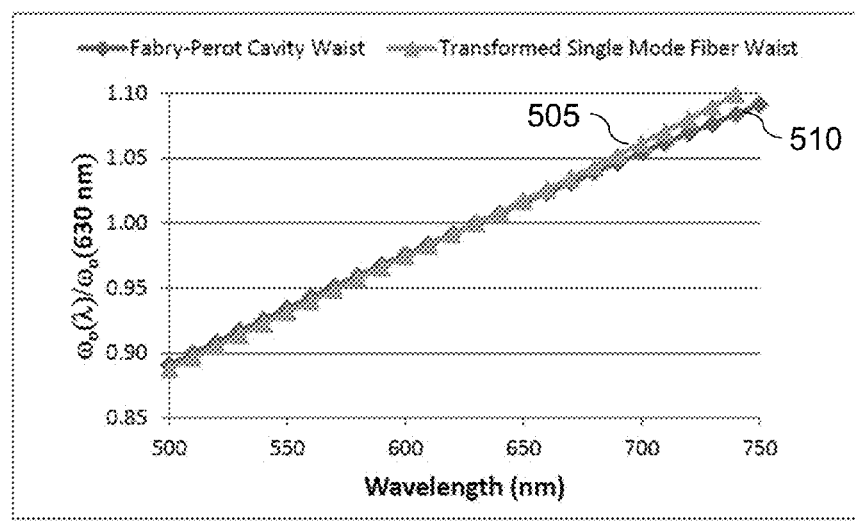
FIG. 5 shows a plot of normalized spot size as a function of wavelength at an output of an unguided propagation section and for the mode of a Fabry-Perot cavity, according to certain aspects of the present disclosure.

FIG. 5 shows a plot 500 of normalized spot size as a function of wavelength at an output ($z=z_{exp}$) of the unguided propagation section (e.g., 420 in FIG. 4) and for the mode of the Fabry-Perot cavity (e.g., 115 in FIG. 1), according to certain aspects of the present disclosure. Specifically, the plot 500 shows curves 505 and 510 of the normalized spot size as a function of wavelength for the unguided propagation section and the Fabry-Perot cavity waist as a function of wavelength for the Fabry-Perot cavity, respectively. As shown by the curves 505 and 510, wavelength dependency of the spot sizes at the output plane of the unguided propagation section and for the mode of the Fabry-Perot cavity is similar (e.g., substantially matched).

In some aspects, the wavelength dependencies are substantially matched when optical coupling between two modes, which can be quantified as a squared-modulus of an overlap integral between two fields, is greater than or equal to 0.99. The optical coupling can be provided by $C_{12}(\lambda)$, which can take the form of Equation 42, as later discussed in the present disclosure. In a case where the wavelength dependencies are substantially matched, $C_{12}(\lambda)$ can be greater than or equal to 0.95, 0.96, 0.97, 0.98, 0.99, 0.995, and any number between these values. FIG. 13B, for example, shows that $C_{12}(\lambda) \geq 0.993$ over a spectral range. Dependent on application (e.g., precision required), wavelength dependencies that are substantially matched can be considered to be matched.

Wavefront of the expanded beam at the output plane at $z=z_{exp}$ of the unguided propagation section is not a beam waist. A wavefront at $z=z_{exp}$ has a wavelength-dependent radius of curvature given by $$R_{fiber}(z_{exp}, \lambda) = z_{exp} + \frac{\pi(\omega_{o_{fiber}}(\lambda))^2}{\lambda z_{exp}} \quad \text{Equation 12}$$

In one or more implementations, the mode matching component (e.g., 110 in FIG. 1) also includes a hybrid lens section that can be specified such that the hybrid lens section can flatten the wavefront (e.g., to a plane wave or close to a plane wave) of the expanded beam at the output plane of the unguided propagation section (e.g., 420 in FIG. 4) while preserving the spot size and wavelength dependence of the expanded beam. Specifically, the hybrid lens section can be specified such that the expanded beam at $z=z_{exp}$ can be transformed into a new beam waist (i.e., wavefront is a plane wave). In one or more implementations, the output of the mode matching component is a beam waist to facilitate creation of a magnified image of the output at the location of the cavity waist. The image of a beam waist is also a beam waist.

In specifying the hybrid lens section, it is convenient to employ a representation of the Gaussian beam in terms of a complex beam parameter $\tilde{q}$ defined by the expression $$\frac{1}{\tilde{q}(z,\lambda)} = \frac{1}{R} - j\frac{\lambda}{\pi\omega^2(z,\lambda)} \quad \text{Equation 13}$$

where, as previously indicated, R denotes radius of curvature and ω denotes spot size.

The Gaussian beam can propagate through an optical system represented by a ray matrix $$M_{21} = \begin{bmatrix} A & B \\ C & D \end{bmatrix}$$

by the following operation $$\tilde{q}_2 = \frac{A\tilde{q}_1 + B}{C\tilde{q}_1 + D} \quad \text{Equation 14}$$

which can be rewritten as $$\frac{1}{\tilde{q}_2} = \frac{D\frac{1}{\tilde{q}_1} + C}{B\frac{1}{\tilde{q}_1} + A} \quad \text{Equation 15}$$

For discussion purposes and to simplify equations, the hybrid lens section can include one or more thin-lens elements. The ray matrix for a thin lens of focal length $f_a$ is given by $$\begin{bmatrix} 1 & 0 \\ -\frac{1}{f_a} & 1 \end{bmatrix} \quad \text{Equation 16}$$

The ray matrix for a combination (e.g., a cascade) of two thin lenses with negligible space between them is given by the product of the ray matrices of the two thin lenses. Specifically, the ray matrix for the combination of the two thin lenses can be given by $$\begin{bmatrix} 1 & 0 \\ -\frac{1}{f_b} & 1 \end{bmatrix} \begin{bmatrix} 1 & 0 \\ -\frac{1}{f_a} & 1 \end{bmatrix} = \begin{bmatrix} 1 & 0 \\ -\frac{1}{f_b} - \frac{1}{f_a} & 1 \end{bmatrix} \quad \text{Equation 17}$$

If the complex beam parameter $\tilde{q}_1$ represents the Gaussian beam at an input to the combination of the two thin lenses and the complex beam parameter $\tilde{q}_2$ represents the Gaussian beam immediately following the lens combination, Equations 13 and 15 can be utilized to obtain $$\frac{1}{\tilde{q}_2(\lambda)} = \frac{1}{R_2(\lambda)} - j\frac{\lambda}{\pi\omega_2^2(\lambda)} = \frac{1}{\tilde{q}_1(\lambda)} - \frac{1}{f_b(\lambda)} - \frac{1}{f_a(\lambda)} = \frac{1}{R_1(\lambda)} - \frac{1}{f_b(\lambda)} - \frac{1}{f_a(\lambda)} - j\frac{\lambda}{\pi\omega_1^2(\lambda)} \quad \text{Equation 18}$$

In equating the real and imaginary parts of Equation 18 separately, the following two expressions can be obtained:

$$\omega_2(\lambda) = \omega_1(\lambda) \quad \text{Equation 19}$$

$$\frac{1}{R_2(\lambda)} = \frac{1}{R_1(\lambda)} - \frac{1}{f_b(\lambda)} - \frac{1}{f_a(\lambda)} \quad \text{Equation 20}$$

The thin-lens combination can preserve the spot size and wavelength dependence while altering radius of curvature of the wavefront. The Gaussian beam immediately following the lens combination can be a new beam waist if the radius of curvature immediately following the lens combination (denoted as $R_2(\lambda)$) is infinite, which occurs when the right hand side of Equation 20 is zero.

In one or more implementations, the hybrid lens section of the mode matching component (e.g., 110 in FIG. 1) can include a refractive lens element with a focal length greater than 0 and a diffractive lens element with a focal length less than 0, which can be referred to as a convergent lens element and a divergent lens element, respectively. In some aspects, the hybrid lens section can be arranged such that the Gaussian beam propagates through the refractive lens first and then propagates through the diffractive lens. The hybrid lens section can be referred to as a hybrid lens, a combination lens, a combination lens section, or diffractive optical element.

The refractive lens element can be a plano-convex lens made from a material with a wavelength-dependent refractive index given by $n_{refr}(\lambda)$. The plano-convex lens can have a positive focal length denoted by $f_{refr}$. The diffractive lens element can be a lens whose focal length $f_{diff}$ is inversely proportional to wavelength, which can be realized by a chirped circular diffraction grating for example. The chirped circular diffraction grating is a circular diffraction grating whose local spatial frequency $\xi(\rho)$ increases linearly with radial coordinate $\rho$. The circular diffraction grating has a local groove spacing $d(\rho)$ that is inversely proportional to a radial distance from its center. In some aspects, the chirped circular diffraction grating has a linear chirp, in which case the local spatial frequency $\xi(\rho)$ is inversely proportional to local groove spacing $d(\rho)$ such that $\xi(\rho) \propto 1/d(\rho)$. FIGS. 6A and 6B show an example of circular diffraction gratings with positive and negative focal lengths, respectively.

The focal lengths for the plano-convex lens and the chirped circular diffraction grating can be respectively given by $$f_{refr} = +\frac{|R_{refr}|}{n_{refr}(\lambda) - 1} \quad \text{Equation 21}$$

$$f_{diffr} = -\frac{|b|}{\lambda} \quad \text{Equation 22}$$

where $|R_{refr}|$ is the geometrical radius of curvature of the convex side of the plano-convex lens and $|b|$ is a positive constant design parameter that governs characteristics of the chirped circular diffraction grating (e.g., local spatial frequency $\xi(\rho)$). The parameter b can be referred to as a diffractive lens design parameter.

Figure 7B:
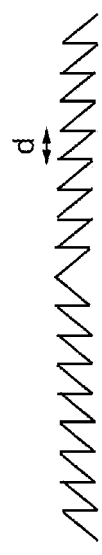
FIGS. 7B through 7D show examples of circular gratings with different local spatial frequency.
Figure 7C:
Figure 7D:
Figure 7E:
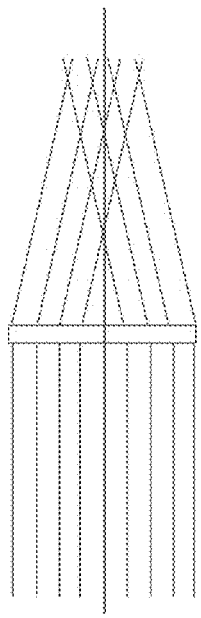
FIGS. 7E through 7G show ray traces for the circular gratings of FIGS. 7B through 7D, respectively.
Figure 7F:
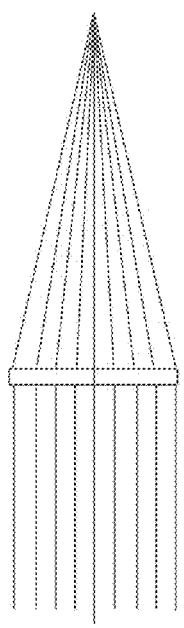
Figure 7G:
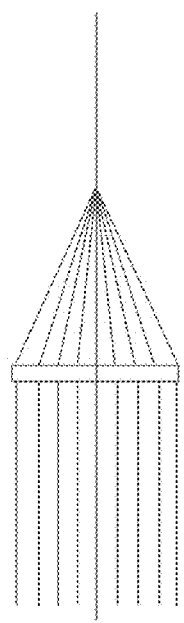

FIG. 7A shows a face view of an example circular grating. FIGS. 7B through 7D show examples of circular gratings with different local spatial frequency $\xi(\rho)$. FIGS. 7E through 7G show ray traces for the circular gratings of FIGS. 7B through 7D, respectively.

FIG. 7B shows a circular grating with a uniform local groove spacing (i.e., $d(\rho)=d$ is a constant). FIG. 7E shows a ray trace of the circular grating of FIG. 7B. As the various rays do not converge to a single point, the circular grating of FIG. 7B is not utilized as a lens.

FIG. 7C shows a circular grating with a linear chirp and a diffractive lens design parameter $b_1$. The local groove spacing $d_1(\rho)$ is given by $d_1(\rho)=b_1/\rho$. FIG. 7F shows a ray trace of the circular grating of FIG. 7C. The circular grating of FIG. 7C can be utilized as a lens with focal length $f_{diffr1}=b_1/\lambda$.

FIG. 7D shows a circular grating with a linear chirp and a diffractive lens design parameter $b_2$, where $b_2<b_1$. The local groove spacing $d_2(\rho)$ is given by $d_2(\rho)=b_2/\rho$, which is less than $d_1(\rho)=b_1/\rho$ for a given value of $\rho$ since $b_2<b_1$. FIG. 7G shows a ray trace of the circular grating of FIG. 7D. The circular grating of FIG. 7D can be utilized as a lens with focal length $f_{diffr2}=b_2/\lambda$, which is less than $f_{diffr1}$.

As shown with reference to FIGS. 7A through 7G, the hybrid lens section can include a pattern of concentric circular rulings in which the local spacing between adjacent rulings has a dependence on the radial coordinate $\rho$ given by $d(\rho)=b/\rho$, where the radial coordinate is a distance from the optical axis (e.g., the axis of symmetry about the hybrid lens section). Bending of a ray incident upon the hybrid lens section can be governed by the Bragg diffraction equation $$\sin(\theta_{diffr}) = \sin(\theta_{inc}) + m\lambda/d(\rho) \quad \text{Equation 23}$$

where $\theta_{diffr}$ is the angle of the diffracted (transmitted) ray, $\theta_{inc}$ is the angle of the incident ray, $d(\rho)$ is the local periodicity, and m is an integer that can be referred to as the diffraction order. In some aspects of the present disclosure, m is 1. In a case where parallel rays are incident on the hybrid lens section with $\theta_{inc}=0$, the angle of the ray leaving (transmitted through) the lens at coordinate p can be given by $\theta_{diffr} \approx \sin(\theta_{diffr}) = \lambda/d(\rho)$. The small angle approximation can be used since $d(\rho) \gg \lambda$ in many cases. If $d(\rho)=b/\rho$, then $\theta_{diffr}(\rho)=\lambda/(b/\lambda)=\rho/(b/\lambda)$. In such a case, the rays from different values of $\rho$ can converge at a point that is a distance $b/\lambda$ behind the hybrid lens section. Accordingly, in some aspects where a circular grating is utilized, the hybrid lens section can be considered a lens with focal length $b/\lambda$. Such a hybrid lens section can be considered to be very dispersive lens, as the focal length is a strong function of $\lambda$.

Figure 8:
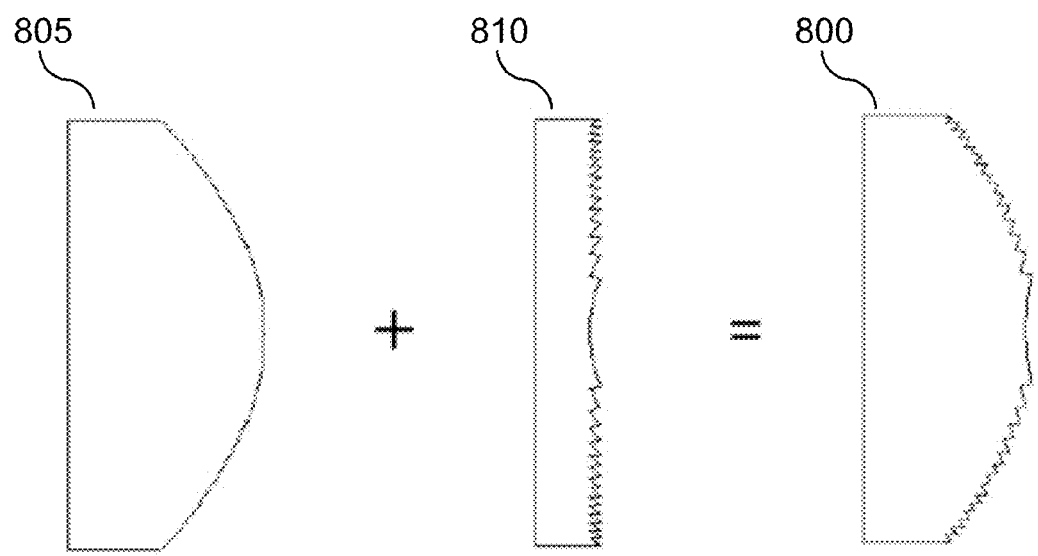
FIG. 8 shows an example hybrid lens section that is formed from a refractive lens and a diffractive lens, according to certain aspects of the present disclosure.

FIG. 8 shows an example of a hybrid lens section 800 that is formed from a refractive lens 805 and a diffractive lens 810, according to certain aspects of the present disclosure. In the example, the refractive lens 805 is a plano-convex lens and the diffractive lens 810 is a negative focal length lens with a chirped circular diffraction grating. The refractive lens 805 and diffractive lens 810 can be in contact with each other. In the thin-lens approximation, (inverse) focal length for the hybrid lens section 800 can be given by $$\frac{1}{f_{comb}} = \frac{1}{f_{refr}} + \frac{1}{f_{diffr}} \quad \text{Equation 24}$$

Figure 9:
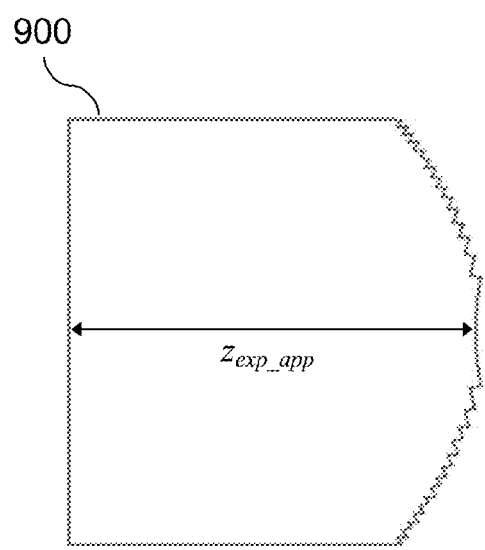
FIG. 9 shows an example mode matching component, according to certain aspects of the present disclosure.

FIG. 9 shows an example of a mode matching component 900, according to certain aspects of the present disclosure. The mode matching component 900 can be a combination of an unguided expansion section and a hybrid lens section. In FIG. 9, the mode matching component 900 is a combination of the unguided expansion section 420 in FIG. 4 and the hybrid lens section 800 in FIG. 8. It is noted that the length of the unguided propagation section $z_{exp}$ can be considered to be the length denoted as $z_{exp\_app}$. In general, dimensions of the hybrid lens section are sufficiently small relative to dimensions of the unguided propagation section such that $z_{exp} \approx z_{exp\_app}$ and accordingly value of $z_{exp\_app}$ can be utilized as $z_{exp}$ in the equations previously provided.

The unguided propagation section and hybrid lens section are generally designed such that wavelength dependencies of $\omega_{o_{fiber}}(\lambda)$ substantially matches wavelength dependencies of $\omega_{o_{cavity}}(\lambda)$ over a spectral range. The hybrid lens section can preserve the spot size and wavelength dependence while altering radius of curvature of the wavefront (e.g., flattening the wavefront received from the output of the unguided propagation section). Within the spectral range, wavelength dependence of a beam waist generated by the mode matching component more closely matches wavelength dependence of the cavity waist than does wavelength dependence of the beam waist from the single-mode optical fiber. The material for the unguided propagation section and the hybrid lens section can be a glass material. The material for each section can be the same or can be different. By way of non-limiting example, the glass material can be P-SF67, P-SF68, SF58, SF59, SF66, PBH71, PBH72, N-SF66, and PBH21, among others.

In some aspects, the material utilized in the unguided propagation section and the material utilized in the hybrid lens can be different. The unguided propagation section can be air or vacuum, for example, with the latter case involving the maintaining of a vacuum in the mode matching component. In a case where air is utilized as the unguided propagation section, a beam from a fiber (e.g., fused silica fiber) exits from the fiber into air and then back into a glass (e.g., of the hybrid lens) from air, thus encountering two interfaces between media of unequal indices of refraction. With each interface encountered by the beam, the beam may experience losses (e.g., Fresnel reflection losses), which can be reduced by application of antireflection coatings at the interfaces.

In some aspects, material utilized in the unguided propagation section and material utilized in the hybrid lens can be the same. With the same material, number of interfaces encountered by a beam that exits the fiber can be reduced, and losses (e.g., Fresnel reflection losses) can be reduced. When the same material is utilized, the unguided propagation section and the hybrid lens can be fabricated monolithically.

In some aspects, the material utilized for the hybrid lens is selected prior to selection of the material for the unguided propagation section. For example, a glass material for the hybrid lens may be selected based on dispersion properties desired of the hybrid lens. Subsequent to selection of the glass material for the hybrid lens, the same glass material can then be utilized for the unguided propagation section.

Programs such as Zemax and CodeV can be utilized to design hybrid lens sections through ray-tracing based lens design. In cases with a grating (e.g., a chirped circular diffraction grating), the programs may model effects of the grating as a phase function instead of representing lines of the grating directly. For example, a circular grating with a local spatial frequency $\xi(\rho)$ that increases linearly with a radial coordinate $\rho$, corresponding to a negative focal lens with focal length $f_{diffr}$ as provided in Equation 22 above, can be represented by a phase function $$\Phi(\rho) = |c_{diffr}|\rho^2 \quad \text{Equation 25}$$

where $c_{diffr} = -\pi/b$ and is a phase parameter associated with the hybrid lens section.

More generally, the hybrid lens sections can be modeled as adding a phase to a ray according to the following polynomial expansion $$\Phi(\rho) = M\Sigma_{i=1}^N A_i \rho^{2i} \quad \text{Equation 26}$$

where N is the number of polynomial terms in the series, $A_i$ is the coefficient of an $i^{th}$ term, and $\rho$ is a ray-intercept coordinate divided by a normalization radius $r_{norm}$. Equation 26 can take the form of Equation 25 when M=1, N=1, and $A_i = A_1 = c_{diffr}$. In some example aspects, M=1, N=1, $A_i = A_1 = c_{diffr} = 4.02 \times 10^7$, and $r_{norm} = 30$ mm.

An expression for the inverse of the radius of curvature of the transformed beam at an output plane (e.g., 112 in FIG. 1) of the mode matching component (e.g., 110 in FIG. 1) can be given by $$\frac{1}{R_2(\lambda)} = \frac{1}{z_{exp} + \frac{\pi}{\lambda z_{exp}} \left\{ \frac{1}{2} a \left[ 0.65 + 1.619 \left( \pi a \frac{NA}{\lambda} \right)^{-1.5} + 2.879 \left( \pi a \frac{NA}{\lambda} \right)^{-6} \right] \right\}^2} - \quad \text{Equation 27}$$

$$\frac{n_{refr}(\lambda) - 1}{|R_{refr}|} - \frac{\lambda}{\pi} c_{diffr}$$

where a is the fiber core diameter, NA is the fiber numerical aperture, $\lambda$ is the wavelength, $z_{exp}$ is a propagation distance of a beam through the unguided propagation section (or approximately the propagation distance through the mode matching component), $n_{refr}(\lambda)$ is the index of refraction of the plano-convex lens, $R_{refr}$ is the convex surface radius of curvature, and $c_{diffr}$ is a phase parameter of the chirped circular diffraction grating diffractive lens element.

In one or more implementations, the radius of curvature of the transformed beam at an output plane of the mode matching component is a plane wave or close to a plane wave such that the right-hand side of Equation 27 is zero or close to zero, respectively. The propagation distance $z_{exp}$ can be determined based on a and NA as previously described. The index of refraction profile $n_{refr}(\lambda)$ from available glasses and the parameters $R_{refr}$ and $c_{diffr}$ can be chosen by minimizing the root-mean-square sum of Equation 27 over the wavelength range of interest $[\lambda_L, \lambda_U]$ so that the right-hand side of Equation 27 is minimized. Specifically, $n_{refr}(\lambda)$, $R_{refr}$, and $c_{diffr}$ are chosen so as to minimize the quantity $$\sqrt{\int_{\lambda_L}^{\lambda_U} d\lambda \left\{ \frac{1}{z_{exp} + \frac{\pi}{\lambda z_{exp}} \left\{ \frac{1}{2}a\left[0.65 + 1.619\left(\pi a \frac{NA}{\lambda}\right)^{-1.5} + 2.879\left(\pi a \frac{NA}{\lambda}\right)^{-6}\right]\right\}^2} - \frac{n_{refr}(\lambda)-1}{|R_{refr}|} - \frac{\lambda}{\pi} c_{diffr} \right\}^2 } \quad \text{Equation 28}$$

Numerical tools can be utilized to perform the minimization. By determining each of the parameters $z_{exp}$, $n_{refr}(\lambda)$, $R_{refr}$, b, and $c_{diffr}$, the mode matching component (e.g., 110 in FIG. 1) can be designed whose wavelength-dependent focal length closely matches wavelength-dependent radius of curvature of the output of the unguided beam expansion section.

Figure 10:
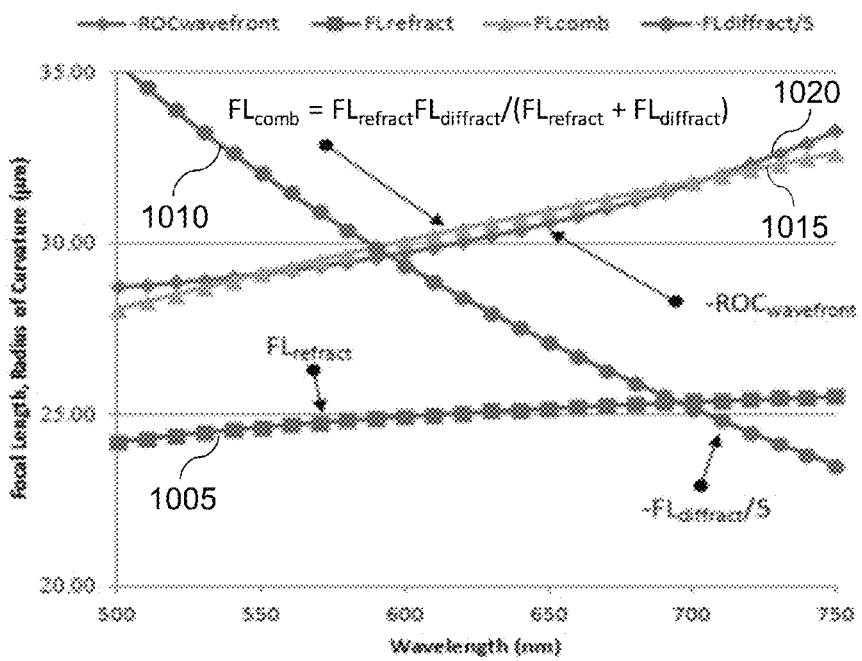
FIG. 10 shows a plot of focal length and radius of curvature as a function of wavelength.

FIG. 10 shows a plot 1000 of focal length and radius of curvature as a function of wavelength. In particular, the plot 1000 shows a curve 1005 for focal length $FL_{refract}$ of a refractive lens (e.g., 805 in FIG. 8); a curve 1010 for $-FL_{diffract}/5$, which is an arbitrarily scaled value of focal length $FL_{diffract}$ of a diffractive lens (e.g., 810 in FIG. 8); a curve 1015 for focal length $FL_{comb}$ of the hybrid lens section (e.g., 800 in FIG. 8) that combines effects of the refractive and diffractive lenses; and a curve 1020 for a radius of curvature $-ROC_{wavefront}$ at an output plane (e.g., $z=z_{exp}$) of an unguided propagation section (e.g., 420 in FIG. 4). As shown by curves 1015 and 1020, the wavelength-dependent focal length of the hybrid lens section closely matches the wavelength-dependent radius of curvature at the output of the unguided propagation section.

With reference back to FIG. 1, in one or more implementations, the beam-relay optical system (e.g., 100 in FIG. 1) can include relay optics. In some aspects, after determining the $z_{exp}$, $R_{refr}(\lambda)$, $R_{refr}$ and $c_{diffr}$, relay optics can be designed to relay a magnified image of the transformed fiber waist (e.g., $\omega_2(\lambda)$) at an output plane 112 of a mode matching component 110 in FIG. 1) to the cavity waist with constant magnification and low wavefront distortion across the wavelength band of interest $[\lambda_L, \lambda_U]$. The relay optics can also be referred to as coupling optics, since the relay optics couples (e.g., relays) the magnified image of the transformed fiber waist to the cavity waist.

As the mode matching component creates a new beam waist with a wavelength scaling similar to wavelength scaling of the cavity waist, a magnification m of the relay optics can be chosen to be a ratio of a mid-band cavity spot size to a mid-band value of the transformed waist spot size $$m = \frac{[\omega_{o_{cavity}}(\lambda_L) + \omega_{o_{cavity}}(\lambda_U)]/2}{[\omega_{fiber}(z_{exp},\lambda_L) + \omega_{fiber}(z_{exp},\lambda_U)]/2} \quad \text{Equation 29}$$

Other equations for determining m can be utilized. Value of m that is utilized depend on application. In general, value of m is greater than 1. In some aspects, the value of m can be within a rough range of 50 to 200. As an example, the cavity waist $\omega_{cavity}$ can be within a rough range of 100 µm to 200 µm and the expanded fiber-mode beam spot size $\omega_{fiber}(z_{exp})$ can be within a rough range of 10 µm to 20 µm.

A quantity $f_o$ can be defined by $$f_o = \frac{\pi}{2} \frac{[\omega_{fiber}(z_{exp},\lambda_L) + \omega_{fiber}(z_{exp},\lambda_U)]}{\lambda_L + \lambda_U} \quad \text{Equation 30}$$

For a mode-matching optic (e.g., lens, mirror) of focal length f, a distance $d_f$ from the optical fiber to the mode-matching optic and a distance $d_c$ from the mode-matching optic to the cavity waist position can be given by the mode-matching formulae of Kogelnik:

$$d_f = f + \frac{1}{m}\sqrt{f^2 - f_o^2} \quad \text{Equation 31}$$

$$d_c = f + m\sqrt{f^2 - f_o^2} \quad \text{Equation 32}$$

For FIG. 1, $d_f$ can be a length of the mode matching component 110, which can be provided by a distance from the point 108 to the point 112 and $d_c$ can be a distance measured along the beam from the output of the mode matching component to the location of the cavity waist, which is the distance along the beam starting at the point 112 and ending at $\omega_3(\lambda)$. In some aspects, $d_f$ can be a distance from an object to a mirror whereas $d_c$ can be a distance from the mirror to an image of the object.

Depending on application (e.g., physical dimensions of an optical system or an apparatus that includes the optical system) within which the mode-matching optic is being employed, any focal length f can be chosen provided that $f > f_o$. For an optical cavity formed by mirrors of equal radius of curvature, the cavity waist will lie in the mid-plane between the two mirrors. In such a case, the focal length f is selected to be large enough such that $d_c > 0.5\ L_{cavity} + t_m$, where $L_{cavity}$ is the length of the cavity and $t_m$ is the thickness of the mirrors.

In one or more implementations, the relay optics can include an off-axis ellipsoidal mirror (e.g., 135 in FIG. 1). In some aspects, the relay optics can also include a plane mirror (e.g., 140 in FIG. 1). The off-axis ellipsoidal mirror is off-axis relative to an axis of the optical fiber (e.g., 105 in FIG. 1) along which the Gaussian beam is propagating in that the beam is not impinging on the off-axis ellipsoidal mirror at a vertex of the parent ellipsoid (e.g., 167 in FIG. 1). An off-axis ellipsoidal mirror is achromatic and can provide focusing between two points at finite conjugates. An off-axis ellipsoidal mirror can be specified by its aperture, vertex radius of curvature, conic constant, and de-centration (e.g., angular distance that the ellipsoidal mirror is off-axis from a vertex of the parent ellipsoid). Although the following discussion utilizes an off-axis ellipsoidal mirror in the relay optics, alternatively or in conjunction, the relay optics can include a doublet lens and/or a triplet lens. The ellipsoidal mirror can be a glass mirror that is coated with protected silver, ultraviolet-enhanced silver, or gold.

Vertex curvature c of an ellipse is given by $$c = \frac{1}{R_{ellipse}} = \frac{a}{b^2} \quad \text{Equation 33}$$

where a and b are the semi-major and semi-minor axes, respectively, and $R_{ellipse}$ is the vertex radius of curvature.

Eccentricity ϵ of an ellipse is given by $$\varepsilon = \sqrt{1-\left(\frac{b}{a}\right)^2} = \sqrt{1-\frac{1}{ac}} \qquad \text{Equation 34}$$

Conic constant of an ellipse is given by $$K=-\epsilon^2 \qquad \text{Equation 35}$$

Since the focal length of the ellipsoidal mirror is given by $f=0.5R_{ellipse}$ and the semi-major axis is $0.5(d_f+d_c)$ (due to geometry of an ellipse), the conic constant of the ellipsoidal mirror is given by $$K = \frac{4f}{d_f + d_c} - 1 \qquad \text{Equation 36}$$

In one or more implementations, an output plane (e.g., 112 in FIG. 1) of a mode matching component (e.g., 110 in FIG. 1) is placed at a first focus $F_1$ of the ellipsoidal mirror (e.g., 135 in FIG. 1). The beam from the output of the mode waist transformer impinges on the ellipsoidal mirror. The reflection from the ellipsoidal mirror is a converging beam that can form a new, magnified waist at a second focus $F_2$ of the ellipsoidal mirror. Aperture of the ellipsoidal mirror is generally de-centered sufficiently such that the converging beam avoids impinging on the mode matching component. The relay optics can further include a plane mirror (e.g., 140 in FIG. 1) that can be placed to direct the converging beam away from forming a waist at the second focus $F_2$ of the ellipsoidal mirror and, instead, direct the converging beam along an axis substantially parallel to the axis of the optical fiber. The single-mode optical fiber, mode matching component, ellipsoidal mirror, and plane mirror can be positioned together so that the imaged waist is coincident with the cavity waist location after passing through a small injection hole (e.g., 130 in FIG. 1) bored in one of the cavity mirrors (e.g., 120 in FIG. 1). Such an implementation is shown in the beam-relay optical system 100 of FIG. 1. In general, the optical resonator (e.g., 115 in FIG. 1) that includes the cavity mirrors is generally much larger than the various optics in the mode matching component, ellipsoidal mirror, and plane mirror such that, in the design of the beam-relay optical system, the general location of the optical resonator can be set prior to placement of the mode matching component, ellipsoidal mirror, and plane mirror.

Accordingly, with continued reference to FIG. 1, in one or more implementations of the present disclosure, a method is provided. The method may include receiving, at a mode matching component 110, a beam from a single-mode optical fiber 105. A beam waist can be generated based on the beam. The beam waist can be relayed to an optical resonator 115 using an relay optical component, which can include an ellipsoidal mirror 135 and a plane mirror 140. The optical resonator can include a cavity and can form a cavity waist at a location within the cavity. Wavelength dependence of the beam waist can substantially match wavelength dependence of a cavity waist associated with the optical resonator 115. In some aspects, the beam waist can be relayed to a location at or close to the cavity waist.

A beam injected in an off-axis manner into a Fabry-Perot cavity can undergo a series of transits, also referred to as bounces, between the cavity mirrors while forming spot patterns that are in general elliptical on each mirror. By choosing proper injection slopes for a given location of the injection hole, trajectory of the spot patterns can be circular, with a constant angular spacing between the spots formed by successive transits. Angular separation between adjacent spots is given by $$\theta_{cavity}=\cos^{-1}(2g_{cavity}^2-1) \qquad \text{Equation 37}$$

where $g_{cavity}$ is referred to as a confocal parameter of the cavity and whose expression has been provided above in Equation 9. The cavity mirrors have a radius of curvature of $R_{cavity}$ and a separation between vertices of the cavity mirrors of $L_{cavity}$.

When a beam is injected into a cavity through a small de-centered hole at coordinates $x_0=r_{pattern}$ and $y_0=0$ and with proper ray slopes $x_0'$ and $y_0'$, coordinates of the spot on subsequent transmits can be given by $$x_n=r_{pattern}\cos(n\theta_{cavity}), y_n=r_{pattern}=\sin(n\theta_{cavity}) \qquad \text{Equation 38}$$

A variable optical delay can be realized by extracting the beam near the opposite mirror after a desired number of transits. Extraction can be accomplished either with a small pick-off mirror mounted on a moveable arm or via a small de-centered hole bored through the mirror. In the latter case, rotating the cavity mirror about its central axis can cause the extraction hole to rotate, and the positioning of the extraction hole relative to a path of the beam can allow the beam to exit the cavity after the desired number of transits. In some aspects, a rotating periscope can be utilized to extract the beam.

Figure 11A:
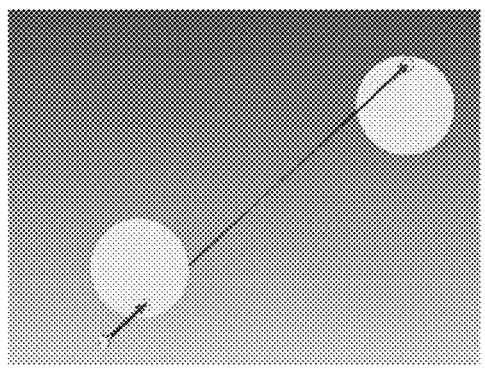
FIGS. 11A through 11E show geometrical ray trace models of a beam making a different numbers of transits in a cavity.
Figure 11B:
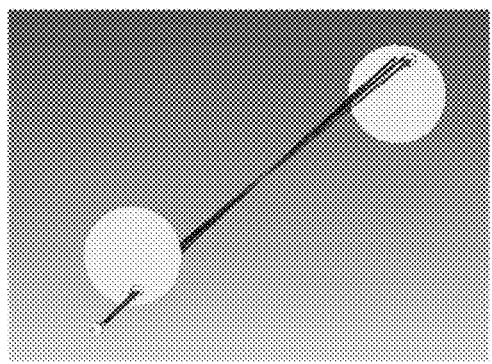
Figure 11C:
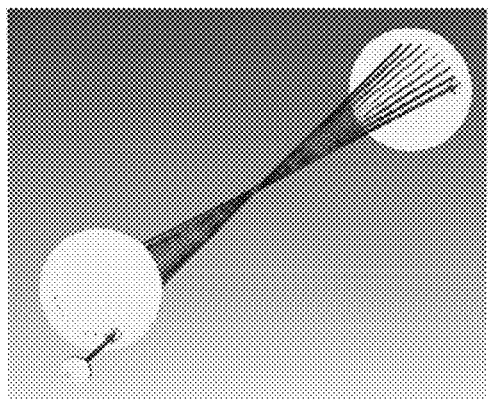
Figure 11D:
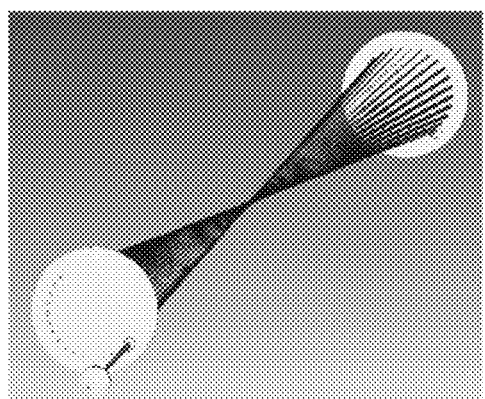
Figure 11E:
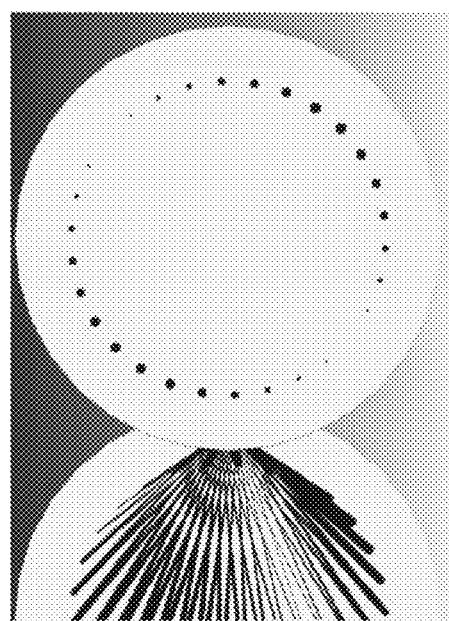

As an example, a cavity mirror radius of curvature and a mirror spacing can be $R_{cavity}=1.750$ m and $L_{cavity}=3.4904$ m, respectively. With appropriate choice of injection coordinates and slopes, a circular spot pattern with 12° of angular separation between successive spots on a given mirror can be obtained. FIGS. 11A through 11E show the ability to generate a variable delay. The variable delay can be realized by extracting a beam from the cavity after the beam has propagated within the cavity for a desired number of transits. Specifically, FIGS. 11A through 11D show geometrical ray trace models of the beam making 1, 5, 17, and 31 transits, respectively. The full 360° locus of geometrical spots on one mirror is shown in FIG. 11E.

In accordance with one or more implementations of the present disclosure, a beam-relay optical system (e.g., 100 in FIG. 1) can be utilized as part of an interferometric observatory. Optical interferometry has been developed as a technique by which to improve resolution of stellar imaging. Optical interferometry used for such an application can be referred to as stellar interferometry. Optical interferometry generally involves light from at least two telescopes that is coherently combined in a beam combiner. The telescopes can be separated by a baseline length, which is a projected separation between any two telescopes as seen from an object (e.g., object which reflects light back to the telescopes). Modulation depth of the resulting fringes, referred to as visibility, can be measured with a digital camera, which is generally a low-noise digital camera. In some aspects, the interferometric observatory can be utilized to reconstruct an image of a geosat. For interferometric imaging of geosats, light is generally collected over a broad spectral bandwidth because objects are generally very faint except during times near equinoxes when there might be specular reflections, called glints, from the Sun.

Repeating the visibility measurement for different baseline lengths and orientations may be equivalent to sampling a spatial Fourier transform of an image in two-dimensional spatial frequency space, referred to as the uv-plane. Making visibility measurements at multiple wavelengths is a way of increasing sampling of the uv-plane, since spatial frequency depends both on the baseline length and the wavelength. The uv-plane can be defined by spatial frequency variables u=$\vec{B}\cdot\hat{x}/\lambda$ and v=$\vec{B}\cdot\hat{y}/\lambda$, where $\vec{B}$ is a baseline vector that separates two telescopes, $\hat{x}$ and $\hat{y}$ can be unit vectors along axes of a Cartesian coordinate plane, and $\lambda$ is the wavelength of the light. By dividing by the wavelength, u and v provide length of the baseline in units of wavelength.

For discussion purposes, optical interferometry involving two telescopes is provided. However, more than two telescopes can be utilized in optical interferometry. In order to observe fringes, the optical path length traversed by light from a first telescope is generally matched to better than 1 μm of light from a second telescope for interferometry at visible wavelengths. The matching of the optical path lengths can be realized with a variable optical delay line that can be placed within a trajectory of the beam of light from one or both of the telescopes. For example, the matching can be realized with a variable optical delay line placed within the trajectory of the telescope that is closer to the object (i.e., the beam of light with the shorter path to travel prior to addition of the variable optical delay line).

Figure 12:
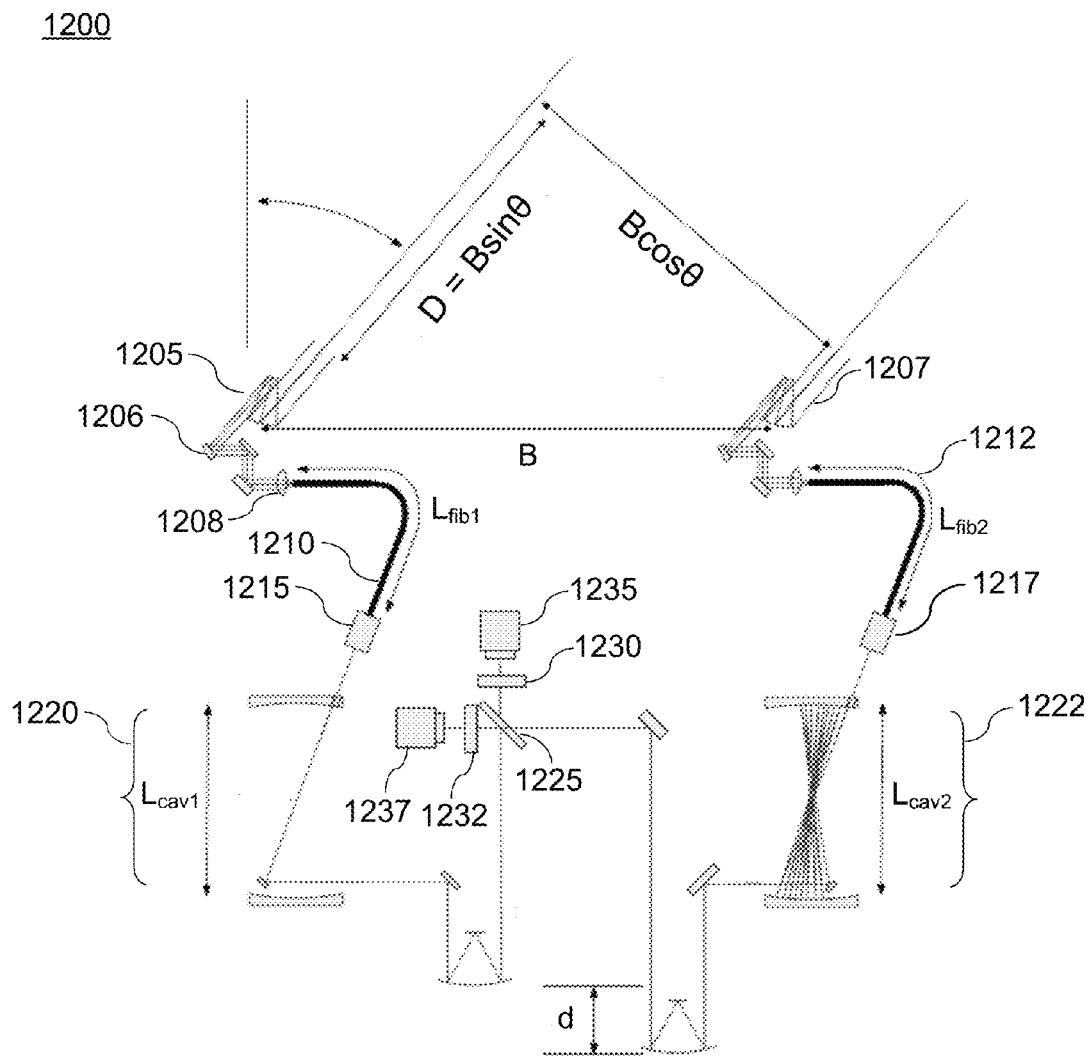
FIG. 12 shows an example interferometric observatory, according to certain aspects of the present disclosure.

FIG. 12 shows an example interferometric observatory 1200, according to certain aspects of the present disclosure. The interferometric observatory 1200 includes a first telescope 1205 and a second telescope 1207 separated from the first telescope by a distance B, which can be referred to as the baseline. The first and second telescopes 1205 and 1207 can receive light that is reflected from an object for example. With a zenith angle of θ, a projected baseline is given by B cos θ and a geometric delay is given by D=B sin θ. The geometric delay is an additional distance that light travels to reach the first telescope 1205 relative to the distance light travels to reach the second telescope 1207.

With reference to the first telescope 1205, at least a portion of the light received by the first telescope 1205 can be steered toward an optical fiber 1210 via optical components such as plane mirrors (e.g., 1206) and coupled into the optical fiber 1210 via optical components such as lenses (e.g., 1208) and prism couplers (not shown). The optical fiber 1210 can be a single-mode optical fiber. Output light from the optical fiber 1210 can be transmitted to a mode matching and relay system 1215. The mode matching and relay system 1215 can include a mode matching component, such as that provided in FIG. 9, and a relay optical component (e.g., including an ellipsoidal mirror 135 and planar mirror 140 in FIG. 1). The relay optical component can relay the output of the mode matching system to an optical cavity 1220. The mode matching system can provide a spot size with a wavelength dependence similar to a wavelength dependence of a spot size of the mode of the optical cavity 1220. In some aspects, the output of the mode matching system has a planar or close to planar wavefront. The beam can be injected into the optical cavity 1220 through a small hole in the optical cavity 1220. The optical cavity 1220 can be utilized to realize a variable optical delay by extracting the beam near the opposite mirror after a desired number of transits.

Similarly, with reference to the second telescope 1207, at least a portion of the light received by the second telescope 1207 can be steered toward an optical fiber 1212. The second telescope 1207 can be associated with an optical fiber 1212, mode matching and beam-relay system 1217, and optical cavity 1222 that correspond generally in functionality to the optical fiber 1210, mode matching and beam-relay system 1215, and optical cavity 1220 associated with the first telescope 1205. In some aspects, as shown in FIG. 1, light received at the first telescope 1205 travels more distance than light received at the second telescope 1207. In a case where cavity length is the same for both optical cavities 1220 and 1222 (i.e., $L_{cav1}=L_{cav2}$), the optical cavity 1220 can have $N_1=1$ transit (e.g., no additional delay), the optical cavity 1222 can have $N_2=1+\text{int}[D/2L_{cav}]$ transits, and the second telescope 1207 can also be associated with an additional path length (e.g., fixed delay) d=½[D−($N_2$−1)$L_{cav}$].

Beams from the optical cavity 1220, which can be referred to as first beams, can be steered to a beam combiner 1225 and combined with beams from the optical cavity 1222, which can be referred to as second beams. The combined beam can be transmitted to a first detector 1235 via an optical filter 1230. The first detector 1235 can provide fringes resulting from the combining of the beams. Similarly, beams from the optical cavity 1222 can be steered to the beam combiner 1225 and combined with beams from the optical cavity 1220. The combined beam can be transmitted to a second detector 1237 via an optical filter 1232. The second detector 1237 can provide fringes resulting from the combining of the beams.

Instantaneous intensities at the first detector 1235 and the second detector 1237 are given by $$I_1 = \frac{\bar{I}}{2}(\vec{P}_1 \cdot \vec{P}_2)C_{12}(\vec{B}, \lambda)[1 + V(\vec{B}, \lambda)\cos\Phi] \quad \text{Equation 39}$$

$$I_2 = \frac{\bar{I}}{2}(\vec{P}_1 \cdot \vec{P}_2)C_{12}(\vec{B}, \lambda)[1 - V(\vec{B}, \lambda)\cos\Phi] \quad \text{Equation 40}$$

where $I_1$ and $I_2$ are instantaneous intensities at the first detector 1235 and the second detector 1237, respectively; $\bar{I}$ is the mean intensity; $\vec{P}_1$ and $\vec{P}_2$ are the polarizations of the first beam and the second beam, respectively; $C_{12}(\vec{B}, \lambda)$ is the coupling efficiency or overlap integral between the spatial modes of the first beam and the second beam; $V(\vec{B}, \lambda)$ is the visibility; and $\Phi$ is the instantaneous phase difference between the first path and the second path.

In some aspects, the visibility $V(\vec{B}, \lambda)$ is the sought-after measurand. The instantaneous phase difference $\Phi$ is generally treated as a random variable. Averaging the square of the difference between the instantaneous intensities over many samples gives $$\overline{(I_1-I_2)^2}=\bar{I}^2(\vec{P}_1\cdot\vec{P}_2)^2[C_{12}(\vec{B},\lambda)]^2[V(\vec{B},\lambda)]^2\overline{\cos^2\Phi} \quad \text{Equation 41}$$

The instantaneous phase difference $\Phi$ can be removed using phase diversity techniques. Value of $V(\vec{B}, \lambda)$ can be determined from Equations 39 through 41 based on measurements made at the first detector 1235 and the second detector 1237. A visibility value that can be measured may be a systematic visibility. The systematic visibility can include effects of impairments due to mismatches between delayed and undelayed beams with respect to the following properties: polarization mismatch, power-balance mismatch, shear misalignment, tilt misalignment, and mode mismatch. Minimization of effects from such impairments can facilitate detection of a science visibility, where the science visibility is a visibility that would be detected absent the effects of the impairments. The science visibility can be used to reconstruct an image of an object being observed, including reconstructing an image of highly structured objects such as geosats for which information regarding details of the structure are generally found at large baselines and for which science visibility is small.

According to certain aspects of the present disclosure, systematic visibility can be increased by reducing mode mismatch through the use of mode matching. The mode mismatch can be reduced by increasing the coupling efficiency or overlap integral $C_{12}(\vec{B}, \lambda)$ between the first and second beams. The overlap integral $C_{12}(\vec{B}, \lambda)$ can be considered a measure of mode matching.

Zemax can be utilized to perform geometrical ray tracing as well as physical optics propagation calculations on Gaussian beams. Results of both geometrical-optics calculations (e.g., chief ray coordinates on a surface) and physical-optics calculations (e.g., spot size on a surface) can be factored into a figure-or-merit function, also known simply as a merit function. Zemax modeling can be performed to establish a baseline performance of coupling from a single-mode optical fiber to a Fabry-Perot optical resonator devoid of a beam-relay optical system (e.g., 100 in FIG. 1) for comparison with performance with the beam-relay optical system provided in accordance with one or more implementations of the present disclosure. In some aspects, a measure of mode matching can be provided as a function of longitudinal separation between two beam waists $\omega_1$ and $\omega_2$ associated with a first beam and a second beam, respectively.

In one or more implementations, the interferometric observatory 1200 can include the beam-relay optical system 100 of FIG. 1. An example of a mode matching system 110 that can be utilized is the mode matching component 900 shown in FIG. 9. With reference to the beam-relay optical system 100 of FIG. 1, an analysis was performed for the case with and without the mode matching component 110. For each of eleven equally-spaced wavelengths across the band [500 nm, 750 nm], a complex optical field at an exit mirror (e.g., 125 or 130) after one transit across the cavity 115 was propagated and stored. Then, the complex optical fields for the same set of wavelengths after successive transits were propagated, and their normalized overlap integrals with respect to the single-transit fields at the same wavelength were calculated. These overlap integrals, which can be quantified as $C_{12}(\lambda)$, were plotted as a function of wavelength. The overlap integrals can be given by $$C_{12}(\lambda) = \frac{\left|\int E_1^*(\lambda) E_2(\lambda) dA\right|^2}{\int |E_1(\lambda)|^2 dA \int |E_2(\lambda)|^2 dA} \quad \text{Equation 42}$$

where $E_1(\lambda)$ can be the single-transit field for wavelength $\lambda$, with its complex conjugate given by $E_1^*(\lambda)$, and $E_2(\lambda)$ can be a complex optical field for the same wavelength $\lambda$ and after one or more transits. The maximum departure from unity, which is the ideal value and indicates a complete overlap of $E_1$ and $E_2$, can serve as the metric for the overlap integrals.

In some aspects, the scaled image (e.g., $\omega_3(\lambda)$ in FIG. 1) of the transformed beam waist can coincide with a location of a cavity waist. In such aspects, the image of the transformed beam waist and the cavity waist are considered mode matched. In other aspects, the image of the transformed beam waist and the location of the cavity waist may be in proximity of each other and are substantially mode matched. In many cases, beam waists that are substantially mode matched can be considered to be mode matched in terms of performance. In a case with two Gaussian beams, the overlap integral $C_{12}(\lambda)$ between the two beam waists $\omega_1$ and $\omega_2$ can take the form $$T = \frac{4\left[4Z^2 + \frac{\omega_1^2}{\omega_2^2}\right]}{\left[4Z^2 + \frac{\omega_2^2 + \omega_1^2}{\omega_2^2}\right]^2 + 4Z^2 \frac{\omega_2^2}{\omega_1^2}} \quad \text{Equation 43}$$

where T can be considered a power transmission coefficient and Z can be considered a normalized separation between the two beam waists. The normalized separation Z can be given by $$Z = \frac{D}{n_2 k \omega_1 \omega_2} \quad \text{Equation 44}$$

where $n_2$ is an index of refraction associated with material through which the second beam propagates, k is a wavenumber given by $k=2\pi/\lambda$, and D is a physical longitudinal separation distance between the two beam waists.

In a case where the beam waists are equal (e.g., $\omega_1=\omega_2=\omega$) and each beam is traveling in vacuum (n=1) or air (n≈1), the power transmission coefficient T can be given by $$T = \frac{4Z^2 + 1}{4Z^4 + 5Z^2 + 1} \quad \text{Equation 45}$$

with the normalized separation Z given by $$Z = \frac{D}{2z_R} \quad \text{Equation 46}$$

The two beam waists $\omega_1$ and $\omega_2$ can be the image of the beam waist and the cavity waist, respectively. In some aspects, the beam waists are substantially mode matched when T≥0.99, which corresponds to Z≤0.1 (and thus D≤0.2$z_R$), over a range of wavelengths (e.g., $[\lambda_L, \lambda_U]$=[500 nm, 750 nm]). In a case where the cavity waist is at location z on the longitudinal axis, the location of the image of the beam waist (e.g., $\omega_3(\lambda)$) can be at location z±δz with δz≤±0.14$z_R$ and be substantially mode matched. As an example, if λ=1 μm and ω=100 μm, then δz≤6.3 mm. In a case where the beam waists are substantially mode matched when T≥$T_1$, values of threshold $T_1$ can include, by way of non-limiting example, 0.95, 0.96, 0.97, 0.98, 0.99, 0.995, and any number between these values over a range of wavelengths. In many cases, beam waists that are substantially mode matched can be considered to be mode matched in terms of performance. Dependent on application (e.g., precision desired, cost considerations), higher or lower threshold values of the power transmission coefficient T can be utilized.

As an example, a baseline performance was modeled by creating a Zemax model of the beam-relay optical system 100 shown in FIG. 1, with the omission of the mode waist transformer 110. Parameters for this baseline model are tabulated in Table 1. The corresponding parameters for the Zemax model of the beam-relay optical system 100 shown in FIG. 1, including the mode matching component 110, are tabulated in Table 2.

TABLE 1

Optical model parameters without mode waist transformer.

| Parameter | Symbol | Value | Units |
|---|---|---|---|
| Fiber core diameter | a | 3.50 | µm |
| Fiber numerical aperture | NA | 0.12 | — |
| Fiber-ellipsoidal mirror distance | $d_f$ | 35.41518 | mm |
| Ellipsoidal mirror de-center | $\delta Y_{ellipse}$ | −9.2 | mm |
| Ellipsoidal mirror radius of curvature | $R_{ellipse}$ | 69.764 | mm |
| Ellipsoidal mirror conic constant | K | −0.94108 | — |
| Ellipsoidal mirror-cavity waist distance | $d_c$ | 2,316.461 | mm |
| Cavity mirror radius of curvature | $R_{cavity}$ | 1,750.00 | mm |
| Cavity mirror diameter | $D_{cavity}$ | 8.00 | in |
| Cavity mirror separation | $L_{cavity}$ | 3,490.421 | mm |
| Spot circle radius | $r_{spot}$ | 75.00 | mm |

TABLE 2

Optical model parameters with mode waist transformer.

| Parameter | Symbol | Value | Units |
|---|---|---|---|
| Fiber core diameter | a | 3.50 | µm |
| Fiber numerical aperture | NA | 0.12 | — |
| Mode transformer glass | — | P-SF68 | — |
| Unguided beam expansion distance | $z_{exp}$ | 37.5 | µm |
| Mode transformer radius of curvature | $R_{comb}$ | 33.95 | µm |
| Hybrid lens normalization radius | $r_{norm}$ | 30 | mm |
| Hybrid lens $\rho^2$ phase coefficient | $c_{diffr}$ | 4.02E+07 | — |
| Fiber-ellipsoidal mirror distance | $d_f$ | 45.92693 | mm |
| Ellipsoidal mirror de-center | $\delta Y_{ellipse}$ | −12.1 | mm |
| Ellipsoidal mirror radius of curvature | $R_{ellipse}$ | 90.00 | mm |
| Ellipsoidal mirror conic constant | K | −0.92066 | — |
| Ellipsoidal mirror-cavity waist distance | $d_c$ | 2,233.512 | mm |
| Cavity mirror radius of curvature | $R_{cavity}$ | 1,750.00 | mm |
| Cavity mirror diameter | $D_{cavity}$ | 8.00 | in |
| Cavity mirror separation | $L_{cavity}$ | 3,490.421 | mm |
| Spot circle radius | $r_{spot}$ | 75.00 | mm |

Figure 13A:
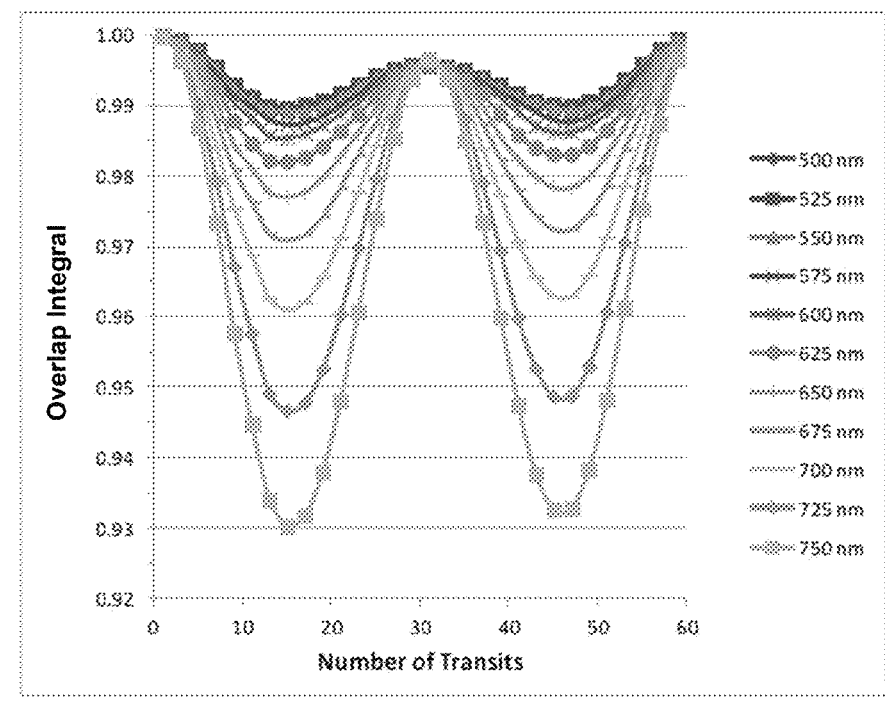
FIGS. 13A and 13B show plots of an overlap integral as a function of transit number for multiple wavelengths for a fiber-coupled delay cavity without and with a mode matching component, respectively, according to certain aspects of the present disclosure.
Figure 13B:
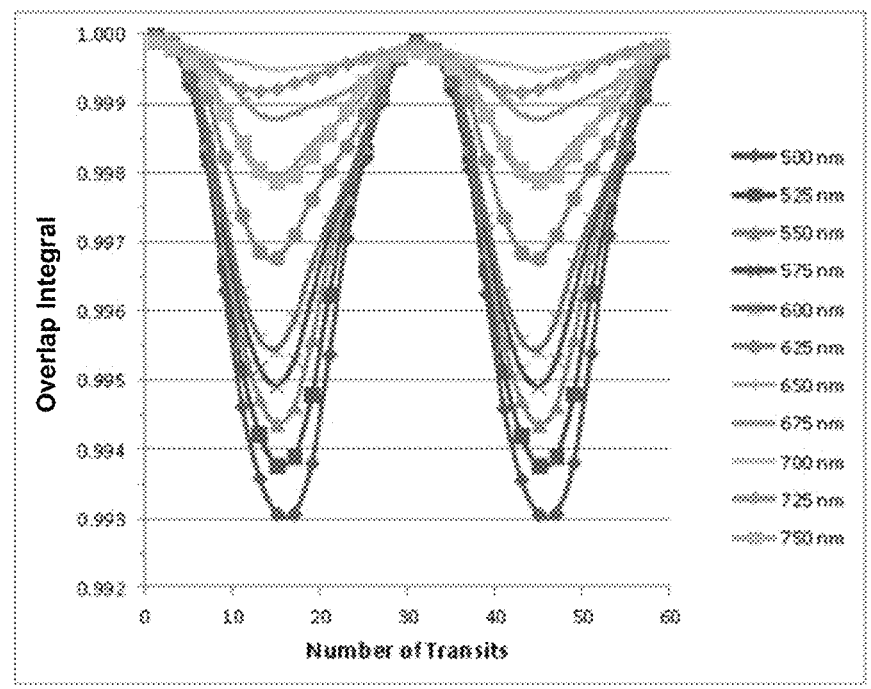

FIG. 13A shows a plot 1300 of an overlap integral as a function of wavelength and transit number is shown for a fiber-coupled delay cavity without a mode matching component (e.g., 110 in FIG. 1). From top-most curve to bottom-most curve, the wavelength corresponding to the curves are 500 nm, 525 nm, 550 nm, 575 nm, 600 nm, 625 nm, 650 nm, 675 nm, 700 nm, 725 nm, and 750 nm. The curves for 500 nm and 525 nm coincide closely with one another. The overlap integral for each wavelength starts out at unity for a single-transit case, as the single-transit case results in a beam's overlap integral with itself is being calculated. The overlap integrals dip by a wavelength-dependent amount, before returning to an intermediate local maximum at 30 transits. Another dip occurs before all wavelengths return to unity overlap integral at 60 transits, at which point the beam position is degenerate with its starting position. The minimum overlap integral is 0.93 (e.g., an overlap integral loss of 7%).

FIG. 13B shows a plot 1350 for a fiber-coupled delay cavity that utilizes a mode matching component (e.g., 110 in FIG. 1), according to certain aspects of the present disclosure. From top-most curve to bottom-most curve, the wavelength corresponding to the curves are 700 nm, 725 nm, 675 nm, 650 nm, 750 nm, 625 nm, 600 nm, 575 nm, 550 nm, 525 nm, and 500 nm. The curves for 750 nm and 650 nm coincide closely with one another. The shapes of the curves are similar to those in FIG. 13A, but the magnitude of loss of the overlap integral has been reduced by an order of magnitude to only 0.7% (compared to a loss of 7% in FIG. 13A).

In some aspects, wavelength dependencies of the beam waists are substantially matched when optical coupling between two modes, which can be quantified by overlap integral $C_{12}(\lambda)$, is greater than or equal to 0.99. In a case where the wavelength dependencies are substantially matched, $C_{12}(\lambda)$ can be greater than or equal to 0.95, 0.96, 0.97, 0.98, 0.99, 0.995, and any number between these values. FIG. 13B, for example, shows that $C_{12}(\lambda) \geq 0.993$ over a frequency band. Dependent on application (e.g., precision required), wavelength dependencies that are substantially matched can be considered to be matched. As previously indicated, for two Gaussian beams, the overlap integral $C_{12}(\lambda)$ between the two beam waists $\omega_1$ and $\omega_2$ can be a power transmission coefficient T that takes the form shown in Equation 43 above.

Figure 14A:
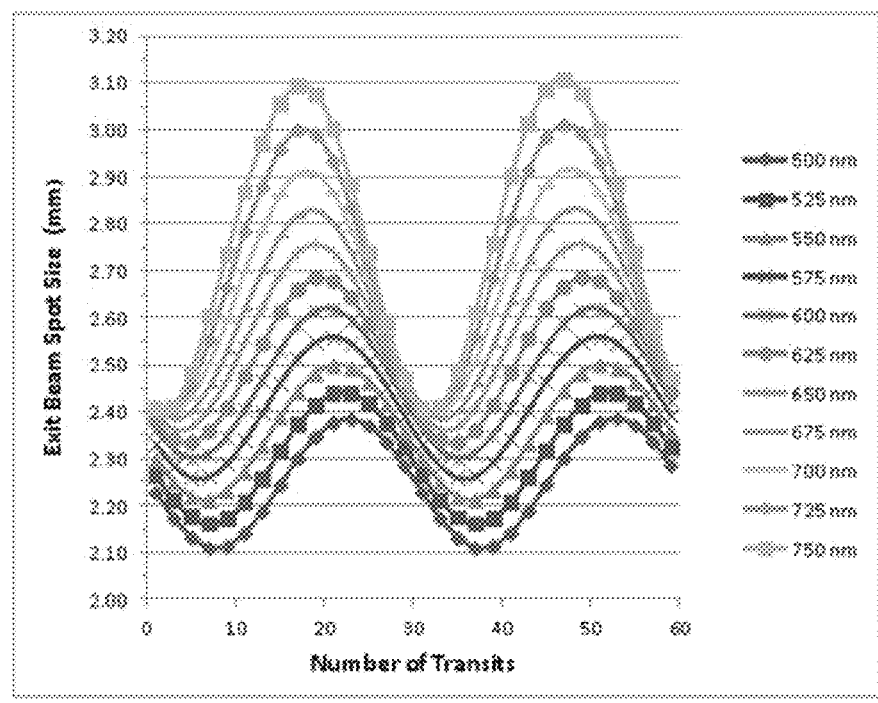
FIGS. 14A and 14B show plots of spot size as a function of transit number for multiple wavelengths for a fiber-coupled delay cavity without and with a mode matching component, according to certain aspects of the present disclosure.

FIG. 14A shows a plot 1400 of spot size as a function of transit number for multiple wavelengths for a fiber-coupled delay cavity without a mode matching component (e.g., 110 in FIG. 1). From top-most curve to bottom-most curve, the wavelength corresponding to the curves are 750 nm, 725 nm, 700 nm, 675 nm, 650 nm, 625 nm, 600 nm, 575 nm, 550 nm, 525 nm, and 500 nm.

Figure 14B:
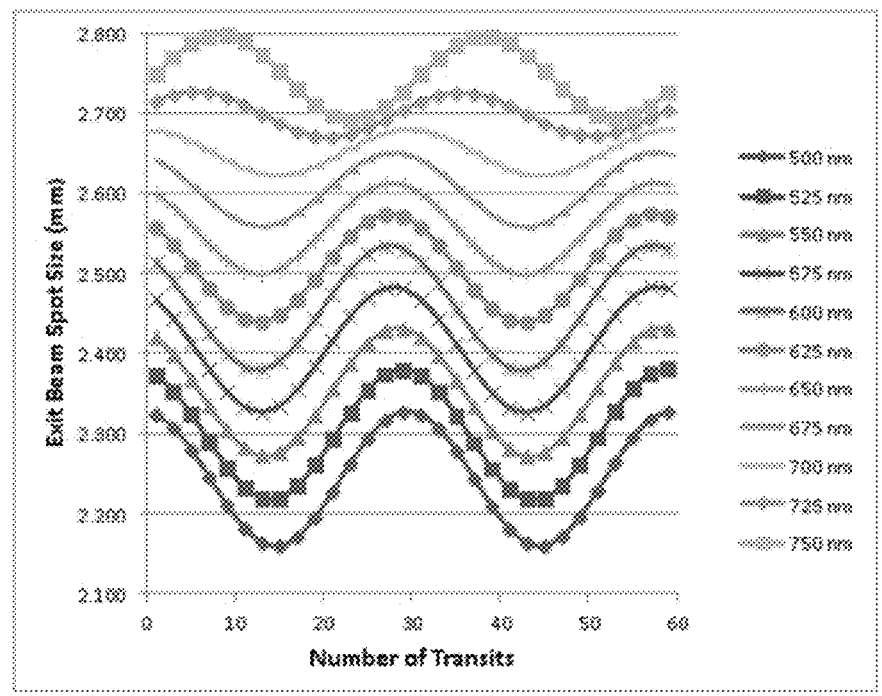

FIG. 14B shows a plot 1450 of spot size as a function of transit number for a fiber-coupled delay cavity with a mode matching component (e.g., 110 in FIG. 1), according to certain aspects of the present disclosure. From top-most curve to bottom-most curve, the wavelength corresponding to the curves are 750 nm, 725 nm, 700 nm, 675 nm, 650 nm, 625 nm, 600 nm, 575 nm, 550 nm, 525 nm, and 500 nm.

Without being bound by theory, improvement shown in FIG. 13B, relative to FIG. 13A, can be provided as follows. If a beam coupled into the Fabry-Perot cavity is an exact match to the spatial eigenmode of the cavity, then the spot size and wavefront curvature of that beam will be exactly reproduced after every round trip though the cavity. Conversely, if the injected beam is not an exact match, then the spot size and wavefront curvature will not be exactly reproduced. From ABCD matrix theory of periodic lens systems, the properties of the injected beam will oscillate, provided the injected beam does not depart too far from the eigenmode. In cases where a mode matching component in accordance with one or more implementations of the present disclosure is not employed, the relayed beam at a given wavelength is less similar to the Fabry-Perot cavity mode at that wavelength relative to a case where a mode matching component is used. This results in the spot size oscillations shown in FIG. 14A. On the other hand, when the mode matching component is employed, the resulting spot size oscillations are shown in FIG. 14B. Oscillations are reduced when the mode matching component is employed, as shown in FIG. 14B.

Figure 15:
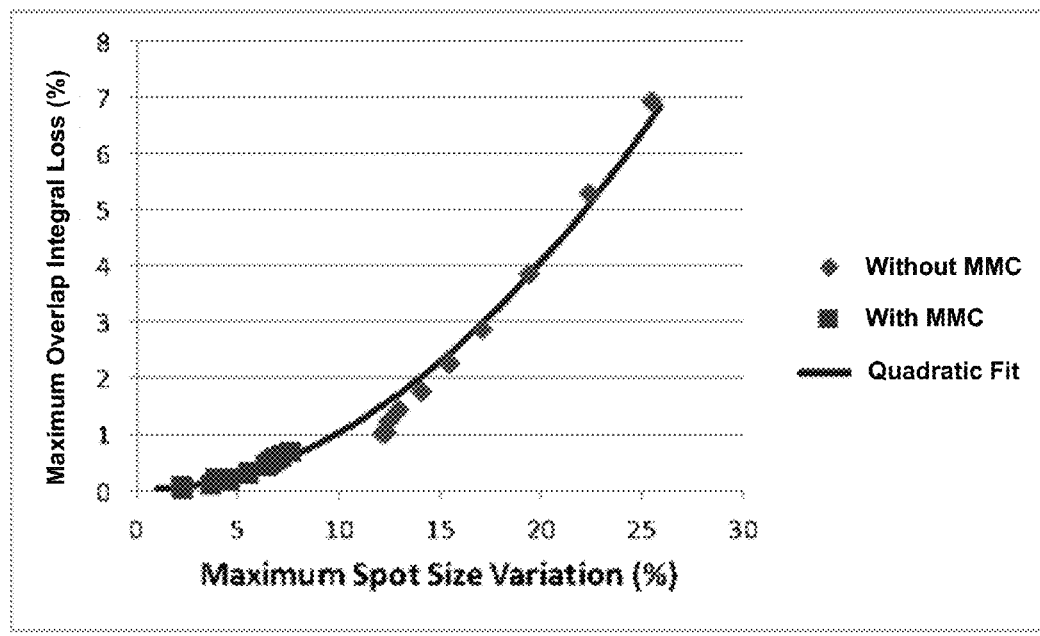
FIG. 15 shows a plot depicting a correlation between spot size oscillation amplitude and overlap integral loss, using model results from the cases with and without the mode matching component, according to certain aspects of the present disclosure.
Figure 16:
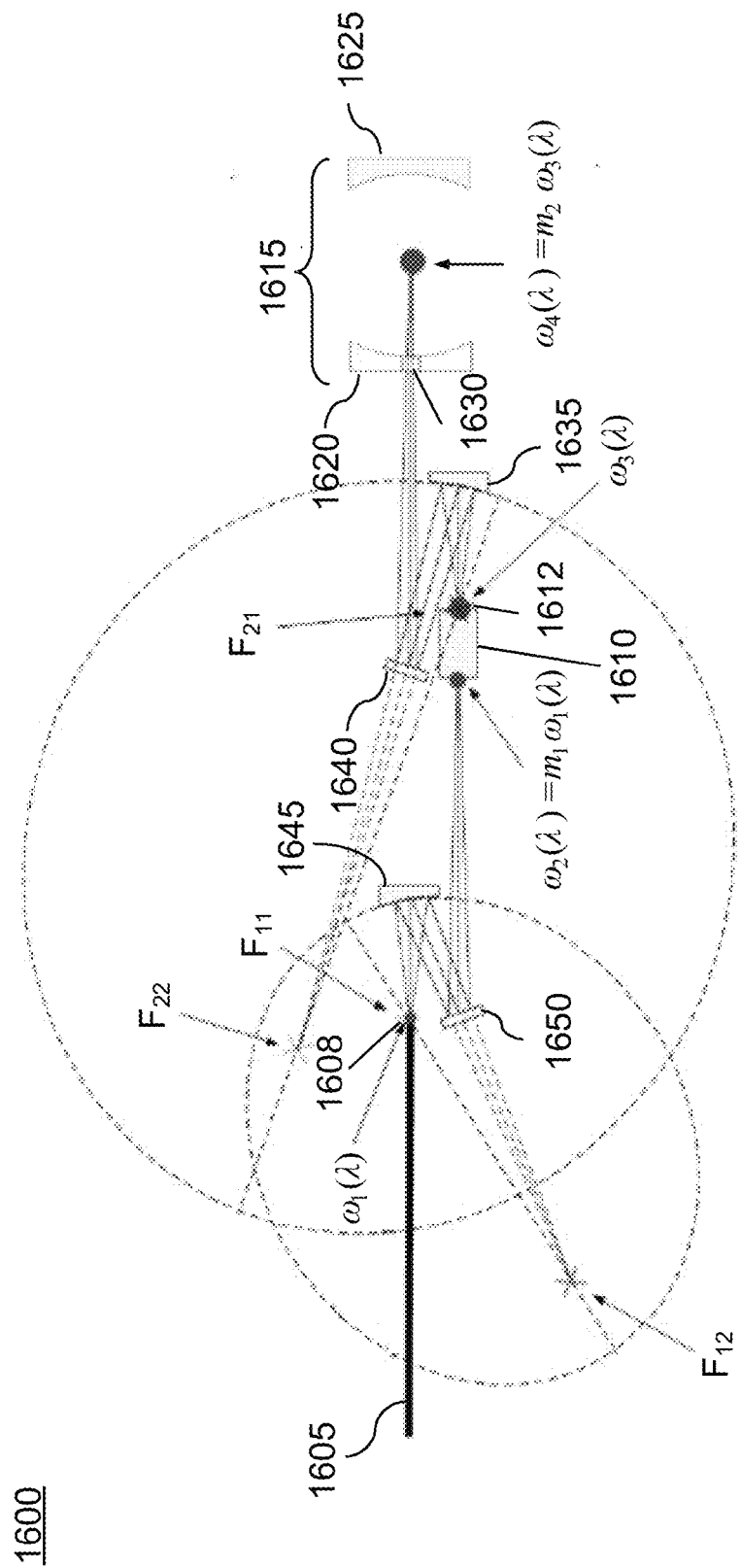

FIG. 15 shows a plot 1500 depicting a correlation between spot size oscillation amplitude and overlap integral loss, using model results from the cases with and without the mode matching component (denoted as "With MMC" and "Without MMC", respectively), according to certain aspects of the present disclosure. Also shown in FIG. 15 is a quadratic fit to the model data. The fit function is overlap integral loss (in percent)=0.010158×[spot size variation (in percent)]². Consistency in behavior of the data with and without the mode matching component can be a result of variation of the exit beam spot size with transit number, which is in turn symptomatic of imperfect matching of the fiber mode to the Fabry-Perot cavity mode across the spectral band. Mode matching over a spectral band can be increased through use of the mode matching component, according to certain aspects of the present disclosure.

Where FIG. 1 shows one example of a beam-relay optical system in accordance with one or more implementations of the present disclosure, additional examples are provided herein. FIG. 16 shows another example of a beam-relay optical system 1600, according to certain aspects of the present disclosure. The beam-relay optical system 1600 includes a single-mode optical fiber 1605, a mode matching component 1610, an optical resonator 1615, a first relay optical component including an ellipsoidal mirror 1645 and a plane mirror 1650, and a second relay optical component including an ellipsoidal mirror 1635 and a plane mirror 1640. Each of the ellipsoidal mirrors 1635 and 1645 can be an off-axis ellipsoidal mirror. The optical resonator 1615 can be a Fabry-Perot cavity that includes a first cavity mirror 1620 and a second cavity mirror 1625.

The mode matching component 1610 can include mode matching optics (not shown) that can receive, at an input plane of the mode matching component 1610, an image $\omega_2(\lambda)=m_1\omega_1(\lambda)$ of a fiber beam waist $\omega_1(\lambda)$ from an output plane 1608 of the single-mode optical fiber 1605 and can transmit a transformed beam waist $\omega_3(\lambda)$ at an output plane 1612 of the mode matching component 1610. An image $\omega_4(\lambda)=m_2\omega_3(\lambda)$ of the transformed beam waist from the mode matching component 1610 can be relayed to the optical resonator 1615. In some aspects, the image can be relayed to the optical resonator 1615. In some aspects, the image of the transformed beam waist can be relayed to a cavity waist. Magnification $m_1$ and $m_2$ can be constant magnification factors that are greater than unity. The mode matching component 1610 can include the mode matching component 900 shown in FIG. 9. The mode matching component 1610 can include an unguided propagation section and hybrid lens section that are generally designed such that wavelength dependencies of $\omega_{o_{fiber}}(\lambda)$ substantially matches wavelength dependencies of $\omega_{o_{cavity}}(\lambda)$ over a spectral range under consideration (e.g., between 500 nm and 750 nm in some aspects).

As shown in FIG. 16, the output plane 1608 of the single-mode optical fiber 1605 can be at a focus $F_{11}$ of the ellipsoidal mirror 1645. The first relay optical component, which includes the ellipsoidal mirror 1645 and the plane mirror 1650, can steer the beam from the output plane 1608 to the input plane of the mode matching component 1610. The plane mirror 1650 is placed to direct a beam away from forming a waist at a focus $F_{12}$ of the ellipsoidal mirror 1645 and, instead, direct the beam to the input plane of the mode matching component 1610.

The output plane 1612 of the mode matching component 1610 can be at a focus $F_{21}$ of the ellipsoidal mirror 1635. The second relay optical component, which includes the ellipsoidal mirror 1635 and the plane mirror 1640, can steer the beam from the output plane 1612 to the optical resonator 1615 through a hole 1630 bored in the first cavity mirror 1620 of the optical resonator 1615. The plane mirror 1640 is placed to direct a beam away from forming a waist at a focus $F_{22}$ of the ellipsoidal mirror 1635 and, instead, direct the beam to the optical resonator 1615. In some aspects, the plane mirror 1650 directs the beam to a cavity waist.

Figure 17:
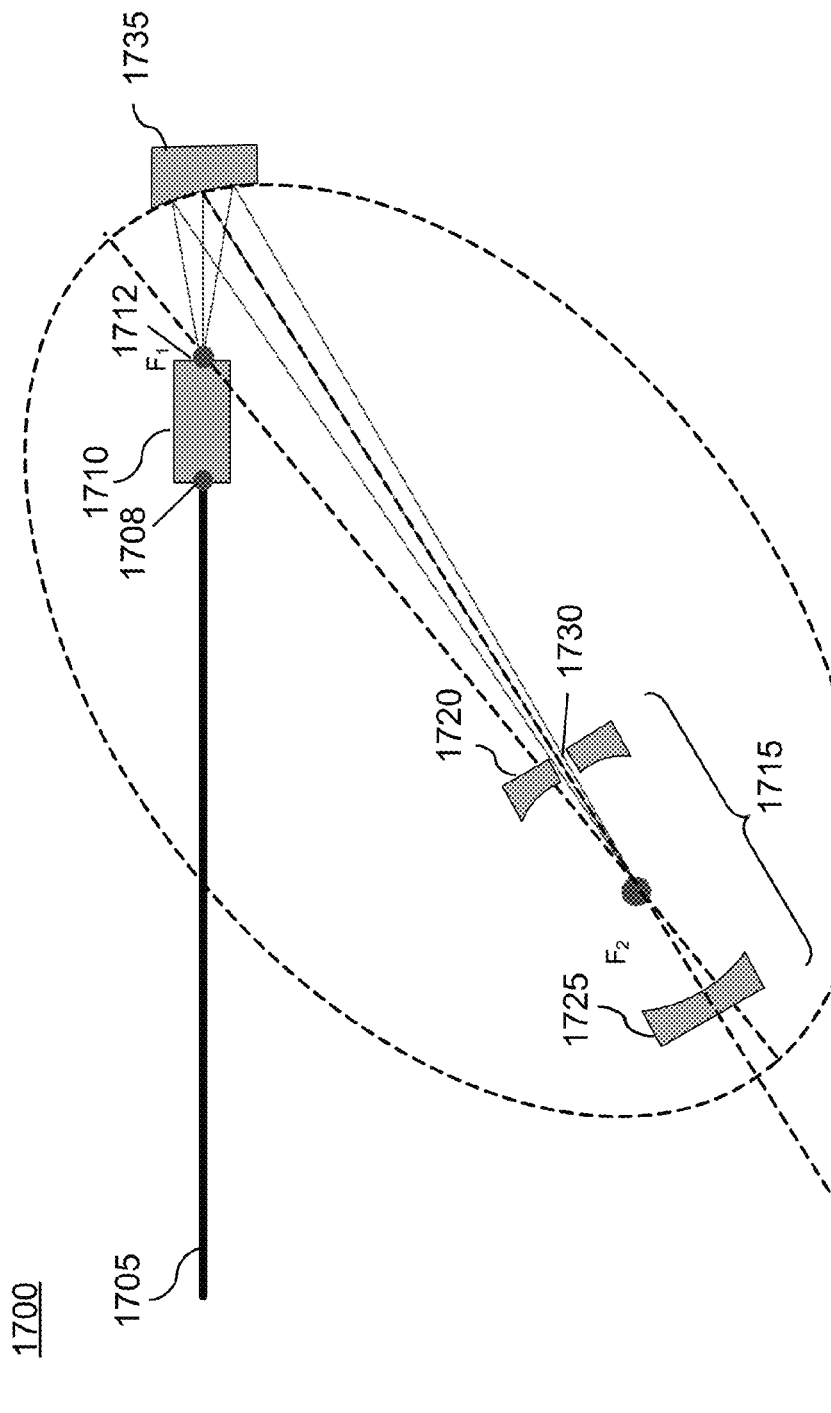

FIG. 17 shows another example of a beam-relay optical system 1700, according to certain aspects of the present disclosure. The beam-relay optical system 1700 includes a single-mode optical fiber 1705, a mode matching component 1710, an optical resonator 1715, and a relay optical component that includes an ellipsoidal mirror 1735. The optical resonator 1715 can be a Fabry-Perot cavity that includes a first cavity mirror 1720 and a second cavity mirror 1725.

The mode matching component 1710 can include mode matching optics (not shown) that can receive, at an input plane of the mode matching component 1710, a fiber beam waist $\omega_1(\lambda)$ from an output plane 1708 of the single-mode optical fiber 1705 and can transmit a transformed beam waist an image $\omega_2(\lambda)$ at an output plane 1712 of the mode matching component 1710. An image $\omega_3(\lambda)=m\omega_2(\lambda)$ of the transformed beam waist from the mode matching component 1710 can be relayed to the optical resonator 1715. In some aspects, the image of the transformed beam waist can be relayed to a cavity waist. Magnification m can be a constant magnification factor that is greater than unity. The mode matching component 1710 can include the mode matching component 900 shown in FIG. 9. The mode matching component 1710 can include an unguided propagation section and hybrid lens section that are generally designed such that wavelength dependencies of $\omega_{o_{fiber}}(\lambda)$ substantially matches wavelength dependencies of $\omega_{o_{cavity}}(\lambda)$ over a spectral range under consideration (e.g., between 500 μm and 750 μm in some aspects).

The output plane 1712 of the mode matching component 1710 can be at a focus $F_1$ of the ellipsoidal mirror 1735. The relay optical component, which includes the ellipsoidal mirror 1735, can steer the beam from the output plane 1712 to the optical resonator 1715 through a hole 1730 bored in the first cavity mirror 1720 of the optical resonator 1715. The ellipsoidal mirror 1735 can steer the beam to a focus $F_2$ of the ellipsoidal mirror 1735. In some aspects, the ellipsoidal mirror 1735 directs the beam to a cavity waist. The cavity waist can be at the location of the focus $F_2$ of the ellipsoidal mirror 1735.

Figure 18:
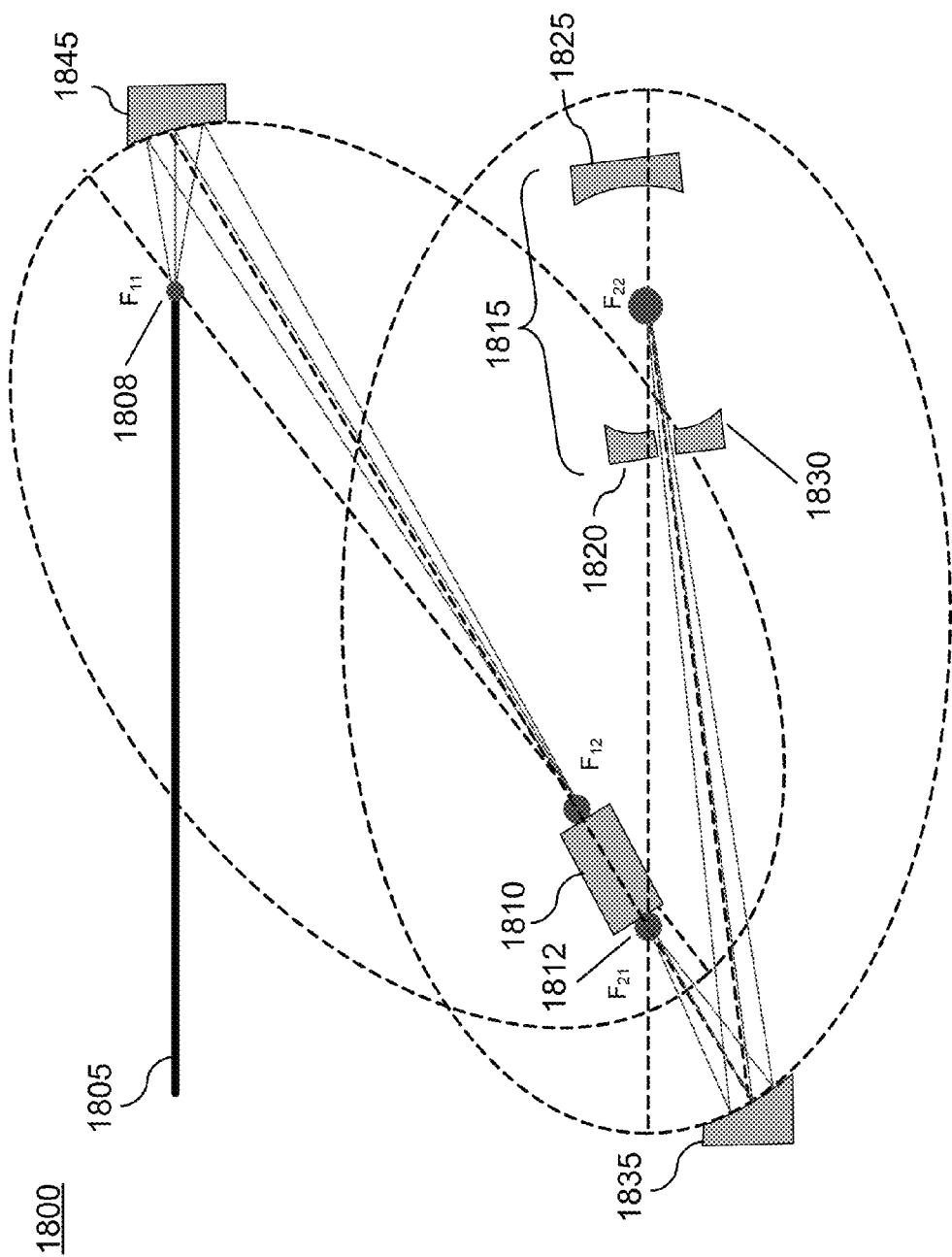

FIG. 18 shows another example of a beam-relay optical system 1800, according to certain aspects of the present disclosure. The beam-relay optical system 1800 includes a single-mode optical fiber 1805, a mode matching component 1810, an optical resonator 1815, a first relay optical component including an ellipsoidal mirror 1845, and a second relay optical component including an ellipsoidal mirror 1835. Each of the ellipsoidal mirrors 1835 and 1845 can be an off-axis ellipsoidal mirror. The optical resonator 1815 can be a Fabry-Perot cavity that includes a first cavity mirror 1820 and a second cavity mirror 1825.

The mode matching component 1810 can include mode matching optics (not shown) that can receive, at an input plane of the mode matching component 1810, an image $\omega_2(\lambda)=m_1\omega_1(\lambda)$ of a fiber beam waist $\omega_1(\lambda)$ from an output plane 1808 of the single-mode optical fiber 1805 and can transmit a transformed beam waist $\omega_3(\lambda)$ at an output plane 1812 of the mode matching component 1810. An image $\omega_4(\lambda)=m_2\omega_3(\lambda)$ of the transformed beam waist from the mode matching component 1810 can be relayed to the optical resonator 1815. In some aspects, the image is a magnified image $\omega_4(\lambda)=m_2\omega_3(\lambda)$ of the transformed beam waist can be relayed to the optical resonator 1815. In some aspects, the image of the transformed beam waist can be relayed to a cavity waist. Magnification $m_1$ and $m_2$ can be constant magnification factors that are greater than unity. The mode matching component 1810 can include the mode matching component 900 shown in FIG. 9. The mode matching component 1810 can include an unguided propagation section and hybrid lens section that are generally designed such that wavelength dependencies of $\omega_{o_{fiber}}(\lambda)$ substantially matches wavelength dependencies of $\omega_{o_{cavity}}(\lambda)$ over a spectral range under consideration (e.g., between 500 nm and 750 nm in some aspects).

As shown in FIG. 18, the output plane 1808 of the single-mode optical fiber 1805 can be at a focus $F_{11}$ of the ellipsoidal mirror 1845. The first relay optical component, which includes the ellipsoidal mirror 1845, can steer the beam from the output plane 1808 to the input plane of the mode matching component 1810. The input plane of the mode matching component 1810 can be placed to coincide with a focus $F_{12}$ of the ellipsoidal mirror 1845.

The output plane 1812 of the mode matching component 1810 can be placed to coincide with a focus $F_{21}$ of the ellipsoidal mirror 1835. The second relay optical component, which includes the ellipsoidal mirror 1835, can steer the beam from the output plane 1812 to the optical resonator 1815 through a hole 1830 bored in the first cavity mirror 1820 of the optical resonator 1815. In some aspects, the plane mirror 1850 directs the beam to a cavity waist. The cavity waist can be at the location of the focus $F_{22}$ of the ellipsoidal mirror 1735.

As previously indicated, in some aspects, $d_f$ can be a distance from an object to a mirror whereas $d_c$ can be a distance from the mirror to an image of the object. With reference to FIG. 18, the distance $d_f$ can be from an output at the output plane 1812 of the mode matching component 1810, which can be considered an object $\omega_3(\lambda)$ to be imaged, to the ellipsoidal mirror 1835. The distance $d_f$ can be from the ellipsoidal mirror 1835 to the image $\omega_4(\lambda)$ of the object $\omega_3(\lambda)$.

FIG. 19 shows another example beam-relay optical system 1900, according to certain aspects of the present disclosure. The beam-relay optical system 1900 includes a single-mode optical fiber 1905, a mode matching component 1910, an optical resonator 1915, and a relay optical component including an doublet lens 1930. The optical resonator 1915 can be a Fabry-Perot cavity that includes a first cavity mirror 1920 and a second cavity mirror 1925.

The mode matching component 1910 can include mode matching optics (not shown) that can receive, at an input plane of the mode matching component 1910, a beam from the single-mode optical fiber 1905 and can transmit a transformed beam waist at an output plane of the mode matching component 1910. An image of the transformed beam waist from the mode matching component 1910 can be relayed to the optical resonator 1915 via a hole 1930 bored in a cavity 1920 of the optical resonator 1915. In some aspects, the image of the transformed beam waist can be relayed to a cavity waist. The mode matching component 1910 can include the mode matching component 900 shown in FIG. 9. The mode matching component 1910 can include an unguided propagation section and hybrid lens section that are generally designed such that wavelength dependencies of $\omega_{o_{fiber}}(\lambda)$ substantially matches wavelength dependencies of $\omega_{cavity}(\lambda)$ over a spectral range under consideration (e.g., between 500 nm and 750 nm in some aspects).

FIG. 20 shows another example beam-relay optical system 2000, according to certain aspects of the present disclosure. The beam-relay optical system 2000 includes a single-mode optical fiber 2005, a mode matching component 2010, an optical resonator 2015, and a relay optical component including a triplet lens 2030. The optical resonator 2015 can be a Fabry-Perot cavity that includes a first cavity mirror 2020 and a second cavity mirror 2025.

The mode matching component 2010 can include mode matching optics (not shown) that can receive, at an input plane of the mode matching component 2010, a beam from the single-mode optical fiber 2005 and can transmit a transformed beam waist at an output plane of the mode matching component 2010. An image of the transformed beam waist from the mode matching component 2010 can be relayed to the optical resonator 2015 via a hole 2030 bored in a cavity 2020 of the optical resonator 2015. In some aspects, the image of the transformed beam waist can be relayed to a cavity waist. The mode matching component 2010 can include the mode matching component 900 shown in FIG. 9. The mode matching component 2010 can include an unguided propagation section and hybrid lens section that are generally designed such that wavelength dependencies of $\omega_{o_{fiber}}(\lambda)$ substantially matches wavelength dependencies of $\omega_{o_{cavity}}(\lambda)$ over a spectral range under consideration (e.g., between 500 nm and 750 nm in some aspects).

FIG. 21 shows a flowchart of an example process 2100 for designing a beam-relay optical system, according to certain aspects of the present disclosure. It is understood that the specific order or hierarchy of steps in the processes disclosed is an illustration of exemplifying approaches. Based upon design preferences, it is understood that the specific order or hierarchy of steps in the processes may be rearranged. Some of the steps may be performed simultaneously.

At step 2105, a wavelength range $[\lambda_L, \lambda_U]$ can be set depending on application. The wavelength range can be the spectral range within which an image of a beam waist is matched or substantially matched to a cavity waist. An example range can be [750 nm, 1,000 nm]. At step 2110, design parameters for an optical fiber, including core diameter a and numerical aperture NA, can be determined. The optical fiber is generally designed to realize a single-mode optical fiber. At step 2115, design parameters for a cavity, including a radius of curvature $R_{cavity}$ for each mirror and a distance $L_{cavity}$ between the mirrors, can be determined.

At step 2120, a range of fiber waist spot size $[\omega_{o_{fiber}}(\lambda_L), \omega_{o_{fiber}}(\lambda_U)]$ can be determined. Equation 6 may be utilized to determine the range. At step 2125, a range of cavity waist spot size $[\omega_{o_{cavity}}(\lambda_L), \omega_{o_{cavity}}(\lambda_U)]$ can be determined. Equation 8 may be utilized to determine the range. At step 2130, a median fiber waist spot size $$< \omega_{o_{fiber}} > = \frac{[\omega_{o_{fiber}}(\lambda_L) + \omega_{o_{fiber}}(\lambda_U)]}{2} \quad \text{Equation 47}$$

can be determined. At step 2135, a median cavity waist spot size $$< \omega_{o_{cavity}} > = \frac{[\omega_{o_{cavity}}(\lambda_L) + \omega_{o_{cavity}}(\lambda_U)]}{2} \quad \text{Equation 48}$$

can be determined.

At step 2140, a length $z_{exp}$ of an unguided beam expansion section of a mode matching component (e.g., 110 in FIG. 1) can be determined. Equation 10 may be used to determine the length $z_{exp}$. At step 2145, a glass for optics in the mode matching component can be selected, including glass for the unguided propagation section and the hybrid lens section. The material for the unguided propagation section and the hybrid lens section can be the same or can be different. A characteristic of the glass can include its refractive index and dispersion properties. At step 2150, parameters for a hybrid lens section of the mode matching component can be determined, including parameters $R_{refr}$ and $c_{diffr}$ for example. At step 2155, a relay-mirror magnification m can be determined. Equation 29 may be used to determine the magnification. At step 2160, a relay-mirror radius of curvature $R_{ellipse}$ can be selected. At step 2165, relay-mirror distances $d_f$ and $d_c$ and conic constant K can be determined. Equations 31, 32, and 35 may be used to determine these parameters. The determined relay-mirror distances $d_f$ and $d_c$ and conic constant K can be estimated values.

At step 2170, an optimization of $d_f$, $d_c$, and K can be performed to maximize overlap integral of the image of the beam waist from the mode matching component with the cavity waist across the wavelength band range $[\lambda_L, \lambda_U]$. At step 2175, injection slopes can be determined to achieve a desired circular spot pattern. In some aspects, the optimization of $d_f$, $d_c$, and K and/or the determination of the injection slopes can be conducted with aid from lens-design programs (such as Zemax).

Various examples of aspects of the disclosure are described as numbered clauses below (e.g., 1, 2, 3, etc.) for convenience. These are provided as examples, and do not limit the subject technology.

1. A beam relay optical system that includes a single-mode optical fiber, an optical mode transformer component, a relay optical element with positive optical power and real conjugates, and a Fabry-Perot resonator, disposed such that the input to the optical mode transformer component is the output of the single-mode optical fiber, the output of the optical mode transformer component forms a beam waist, and the relay optical element forms a magnified image at the Fabry-Perot cavity waist of the output waist of the optical mode transformer component.
2. A beam relay optical system with elements as listed in clause 1, in which the optical mode transformer component includes an unguided expansion section, a refractive lens, and a chirped circular diffraction grating.
3. A beam relay optical system with elements as listed in clause 1 or 2, in which the relay optical element includes an off-axis ellipsoidal mirror.
4. A beam relay optical system with elements as listed in any one of clauses 1 through 3, in which the relay optical element includes a doublet lens.
5. A beam relay optical system with elements as listed in any one of clauses 1 through 4, in which the relay optical element includes a triplet lens.
6. A beam relay optical system with elements as listed in any one of clauses 1 through 5, in which each element is designed in accordance with the flowchart shown in FIG. 21.
7. A beam relay optical system with elements as listed in any one of clauses 1 through 6, in which a plurality of plane mirrors are disposed between the relay optical element and the waist of the Fabry-Perot resonator to redirect and steer the injected beam.
8. A beam relay optical system that includes a single-mode optical fiber, first and second relay optical elements with positive optical power and real conjugates, an optical mode transformer component, and a Fabry-Perot resonator, disposed such that the first relay optical element forms a magnified beam waist image of the output of the single-mode optical fiber, the input to the optical mode transformer component is the image waist of the first relay optical element, the output of the optical mode transformer component is a beam waist, and the second relay optical element forms a magnified image at the Fabry-Perot cavity waist of the output waist of the optical mode transformer component.
9. A beam relay optical system with elements as listed in clause 8, in which the optical mode transformer component includes an unguided expansion section, a refractive lens, and a chirped circular diffraction grating.
10. A beam relay optical system with elements as listed in clause 8 or 9, in which the first relay optical element includes an off-axis ellipsoidal mirror.
11. A beam relay optical system with elements as listed in any one of clauses 8 through 10, in which the first relay optical element includes a doublet lens.
12. A beam relay optical system with elements as listed in any one of clauses 8 through 11, in which the first relay optical element includes a triplet lens.
13. A beam relay optical system with elements as listed in any one of clauses 8 through 12, in which the second relay optical element includes an off-axis ellipsoidal mirror.
14. A beam relay optical system with elements as listed in any one of clauses 8 through 13, in which the second relay optical element is a doublet lens.
15. A beam relay optical system with elements as listed in any one of clauses 8 through 14, in which the second relay optical element is a triplet lens.
16. A beam relay optical system with elements as listed in any one of clauses 8 through 15, in which a plurality of plane mirrors are disposed between the first relay optical element and the optical mode transformer component to redirect and steer the injected beam.
17. A beam relay optical system with elements as listed in any one of clauses 8 through 16, in which a plurality of plane mirrors are disposed between the second relay optical element and the waist of the Fabry-Perot resonator to redirect and steer the injected beam.
18. A beam relay optical system with elements as listed in any one of clauses 1 through 17, in which the beam relay optical system is employed as an optical delay line in an optical signal processing system.
19. A beam relay optical system with elements as listed in any one of clauses 1 through 17, in which the beam relay optical system is employed as an optical delay line in an optical communications system.
20. A beam relay optical system with elements as listed in any one of clauses 1 through 17, in which the beam relay optical system is employed as an optical delay line in an interferometric observatory for space situational awareness.

In accordance with one or more implementations of the present disclosure, systems and methods for providing mode matching between an output mode of a single-mode optical fiber and the fundamental transverse electric and magnetic ($TEM_{0,0}$) mode of an optical resonator are provided. The optical systems can include a single-mode optical fiber, a mode matching component, a relay optical component, and an optical resonator. The mode matching component can generate a new beam waist with a flat wavefront and a spot-size versus wavelength characteristic that closely (e.g., substantially) matches that of the optical resonator waist. According to various aspects of the present disclosure, such systems and methods can be provided for improving optical systems such that better images, such as images of geosats, can be resolved.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these aspects will be readily apparent to those skilled in the art, and generic principles defined herein may be applied to other aspects. Thus, many changes and modifications may be made to the subject technology, by one having ordinary skill in the art, without departing from the scope of the subject technology.

It is understood that the specific order or hierarchy of steps in the processes disclosed is an illustration of exemplifying approaches. Based upon design preferences, it is understood that the specific order or hierarchy of steps in the processes may be rearranged. Some of the steps may be performed simultaneously.

It is noted that dimensional aspects provided above are examples and that other values for the dimensions can be utilized in accordance with one or more implementations. Furthermore, the dimensional aspects provided above are generally nominal values. As would be appreciated by a person skilled in the art, each dimensional aspect has a tolerance associated with the dimensional aspect. Similarly, aspects related to distances between features also have associated tolerances.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A reference to an element in the singular is not intended to mean "one and only one" unless specifically stated, but rather "one or more". The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for". Furthermore, to the extent that the term "include", "have", or the like is used in the description or the claims, such term is intended to be inclusive in a manner similar to the term "comprise" as "comprise" is interpreted when employed as a transitional word in a claim.

What is claimed is:

1. A beam-relay optical system, comprising:
   a single-mode optical fiber;
   a mode matching component configured to receive a beam from the single-mode optical fiber and generate, at an output plane of the mode matching component, a beam waist based on the beam;
   an optical resonator comprising a cavity, the optical resonator configured to form a cavity waist at a location within the cavity; and
   a relay optical component configured to relay an output of the mode matching component to the optical resonator and form an image of the beam waist in the cavity,
   wherein, within a range of wavelengths, wavelength dependence of the beam waist substantially matches wavelength dependence of the cavity waist.

2. The beam-relay optical system of claim 1, wherein the relay optical component is configured to form the image of the beam waist at a location close to the location of the cavity waist.

3. A beam-relay optical system, comprising:
   a single-mode optical fiber;
   a mode matching component configured to receive a first beam waist from the single-mode optical fiber and generate, at an output plane of the mode matching component, a second beam waist based on the first beam waist;
   an optical resonator comprising a cavity, the optical resonator configured to form a cavity waist at a location within the cavity; and
   a relay optical component configured to relay an output of the mode matching component to the optical resonator and form an image of the second beam waist in the cavity,
   wherein, within a range of wavelengths, wavelength dependence of the second beam waist more closely matches wavelength dependence of the cavity waist than does wavelength dependence of the first beam waist.

4. The beam-relay optical system of claim 3, wherein:
   the relay optical component is configured to form the image of the second beam waist at a location close to the location of the cavity waist.

5. The beam-relay optical system of claim 1, wherein the mode matching component comprises an unguided expansion section, a refractive lens element, and a diffractive lens element.

6. The beam-relay optical system of claim 5, wherein the diffractive lens element comprises a chirped circular diffraction grating.

7. The beam-relay optical system of claim 1, wherein:
the relay optical component comprises at least one ellipsoidal mirror, wherein the at least one ellipsoidal mirror has a first focus and a second focus, and
an output plane of the mode matching component is placed at one of the first focus or the second focus.

8. The beam-relay optical system of claim 7, wherein the at least one ellipsoidal mirror is an off-axis ellipsoidal mirror.

9. The beam-relay optical system of claim 1, wherein:
the relay optical component comprises at least one ellipsoidal mirror, wherein the at least one ellipsoidal mirror has a first focus and a second focus, and
an output plane of the single-mode optical fiber is placed at one of the first focus or the second focus.

10. The beam-relay optical system of claim 1, wherein:
the relay optical component comprises one or more plane mirrors along a path from the mode matching component to the optical resonator, and
the one or more plane mirrors are configured to redirect a beam to the optical resonator.

11. The beam-relay optical system of claim 1, wherein the optical relay component comprises at least one of an ellipsoidal mirror, a doublet lens, or a triplet lens.

12. A method, comprising:
receiving, at a mode matching component, a beam;
generating, by the mode matching component, a beam waist based on the beam;
relaying the beam waist to an optical resonator, wherein the optical resonator comprises a cavity, to form an image of the beam waist in the cavity,
wherein:
the optical resonator is configured to form a cavity waist at a location within the cavity, and
within a range of wavelengths, wavelength dependence of the beam waist substantially matches wavelength dependence of the cavity waist.

13. The method of claim 12, wherein the relaying comprising relaying the beam waist to the optical resonator to form the image of the beam waist at a location close to the location of the cavity waist.

14. The method of claim 12, wherein the receiving comprises receiving, at the mode-matching component, a beam waist from a single-mode optical fiber.

15. The method of claim 14, wherein the beam waist from the single-mode optical fiber is at a first focus of an ellipsoidal mirror.

16. The method of claim 14, wherein, within a range of wavelengths, wavelength dependence of the generated beam waist more closely matches wavelength dependence of the cavity waist than does wavelength dependence of the beam waist from the single-mode optical fiber.

17. The method of claim 12, wherein the generating comprises:
expanding the beam; and
flattening a wavefront of the expanded beam to obtain the generated beam waist.

18. The method of claim 12, wherein:
the beam waist is generated at a first focus of an ellipsoidal mirror, and
the relaying comprises relaying the beam waist from the first focus of the ellipsoidal mirror to the optical resonator via the ellipsoidal mirror.

* * * * *